United States Patent
Hoefken

(10) Patent No.: US 11,028,910 B2
(45) Date of Patent: Jun. 8, 2021

(54) SPIRAL CAM GEARBOX MECHANISM

(71) Applicant: Motus Labs, LLC, Dallas, TX (US)

(72) Inventor: Carlos A. Hoefken, Dallas, TX (US)

(73) Assignee: MOTUS LABS, LLC, Dallas, TX (US)

( * ) Notice: Subject to any disclaimer, the term of this patent is extended or adjusted under 35 U.S.C. 154(b) by 127 days.

(21) Appl. No.: 16/541,892

(22) Filed: Aug. 15, 2019

(65) Prior Publication Data
US 2019/0368580 A1     Dec. 5, 2019

Related U.S. Application Data

(63) Continuation of application No. 16/194,053, filed on Nov. 16, 2018, now Pat. No. 10,428,916, which is a continuation-in-part of application No. 14/995,094, filed on Jan. 13, 2016, now Pat. No. 10,260,606, which is a continuation of application No. 13/795,488, filed on Mar. 12, 2013, now Pat. No. 9,261,176.

(51) Int. Cl.
*F16H 25/06*     (2006.01)
*F16H 29/04*     (2006.01)

(52) U.S. Cl.
CPC ............. *F16H 25/06* (2013.01); *F16H 29/04* (2013.01); *Y10T 74/18296* (2015.01)

(58) Field of Classification Search
CPC ..... F16H 25/06; F16H 29/04; Y10T 74/18296
See application file for complete search history.

(56) References Cited

U.S. PATENT DOCUMENTS

| | | | |
|---|---|---|---|
| 1,666,458 | A | 4/1928 | Leland |
| 2,071,235 | A | 2/1937 | Newman |
| 2,167,590 | A | 7/1939 | Slaugenhop |
| 3,088,333 | A | 5/1963 | Walton |

(Continued)

FOREIGN PATENT DOCUMENTS

CN     102121511 B     7/2011

OTHER PUBLICATIONS

Schwartz et al, "Making the Right Shaft Connections," MachineDesign, Aug. 1, 2000, pp. 1-26, online document.

*Primary Examiner* — David M Fenstermacher
(74) *Attorney, Agent, or Firm* — Jeffrey G. Degenfelder; Carstens & Cahoon, LLP

(57) ABSTRACT

The improved gearbox mechanism of the present invention includes a plurality of cam-actuated gear block assemblies, which transfer power from a power shaft to a secondary or output gear element. Each gear block assembly includes a gear block having a surface that periodically interfaces with a secondary or output gear element. In a preferred embodiment the interface surface comprises a plurality of projections or teeth which correspond to complementary holes, projections or gear teeth on the output gear element. Each gear or torque block assembly further includes pivot assemblies, which connect or link the torque block to a cam assembly, which in turn is connected to a power source. The cam assembly comprises a set of corresponding cam elements arranged in a tandem configuration and having a unique circuitous pathway or groove formed therein so that the movement of the torque block may be controlled in three dimensions in accordance with a certain design parameter. In a preferred embodiment, a portion of the pathway is generally spiral in shape.

30 Claims, 23 Drawing Sheets

(56) References Cited

U.S. PATENT DOCUMENTS

| | | | |
|---|---|---|---|
| 3,650,157 | A | 3/1972 | Strathearn et al. |
| 3,848,474 | A | 11/1974 | Epstein |
| 4,075,893 | A | 2/1978 | Koch |
| 4,179,945 | A | 12/1979 | Obermann |
| 4,743,763 | A | 5/1988 | Cutburth et al. |
| 4,856,378 | A * | 8/1989 | Hvolka ............... F16H 25/06 475/168 |
| 5,312,306 | A * | 5/1994 | Folino ............... F16H 25/06 475/196 |
| 5,321,988 | A * | 6/1994 | Folino ............... F16H 25/06 475/196 |
| 5,351,568 | A | 10/1994 | Feterl |
| 5,600,999 | A * | 2/1997 | Folino ................ F16H 3/72 475/196 |
| 5,722,910 | A | 3/1998 | Folino |
| 5,989,144 | A * | 11/1999 | Chen ................... F16H 1/32 475/168 |
| 5,989,145 | A * | 11/1999 | Bursal ............... F16H 25/06 475/185 |
| 6,068,573 | A * | 5/2000 | Folino ............... F16H 25/06 475/196 |
| 6,109,136 | A | 8/2000 | Dold |
| 6,202,509 | B1 | 3/2001 | Dold |
| 6,220,115 | B1 | 4/2001 | Him et al. |
| 6,231,468 | B1 | 5/2001 | Bajulaz |
| 6,805,025 | B2 | 10/2004 | Ruttor |
| 7,086,309 | B2 | 8/2006 | Stoianovici et al. |
| 7,211,016 | B2 | 5/2007 | Yan et al. |
| 8,516,981 | B2 | 8/2013 | Jacques et al. |
| 8,998,763 | B2 | 4/2015 | Wengenroth |
| 9,261,176 | B2 | 2/2016 | Hoefken |
| 9,327,618 | B2 | 5/2016 | Villarroel et al. |
| 9,394,984 | B2 | 7/2016 | Balsiger |
| 2001/0020399 | A1 | 9/2001 | Angeles et al. |
| 2003/0047025 | A1 * | 3/2003 | Ruttor ................ F16H 49/001 74/640 |
| 2005/0229731 | A1 | 10/2005 | Parks et al. |
| 2005/0250617 | A1 * | 11/2005 | Sagawa ............... F16H 25/06 476/40 |
| 2005/0268872 | A1 * | 12/2005 | Klindworth ........... F01L 1/352 123/90.17 |
| 2006/0154774 | A1 * | 7/2006 | Naude ................ F16H 29/04 475/16 |
| 2009/0179504 | A1 * | 7/2009 | Berrocal ............. B25J 19/063 307/326 |
| 2009/0205451 | A1 * | 8/2009 | Bayer ................ F16H 49/001 74/325 |
| 2010/0024593 | A1 * | 2/2010 | Schmidt .............. F16H 25/06 74/640 |
| 2010/0206686 | A1 | 8/2010 | Johnson et al. |
| 2011/0298322 | A1 | 12/2011 | Sherwin et al. |
| 2012/0289372 | A1 * | 11/2012 | Wengenroth ......... F16H 25/06 475/168 |
| 2012/0291731 | A1 | 11/2012 | Parsche |
| 2013/0255421 | A1 | 10/2013 | Schmidt et al. |
| 2014/0015382 | A1 | 1/2014 | Kim |
| 2014/0232159 | A1 | 8/2014 | Villarroel et al. |
| 2014/0248017 | A1 | 9/2014 | Nakada |
| 2014/0260721 | A1 | 9/2014 | Hoefken |
| 2016/0116021 | A1 | 4/2016 | Jacobson |
| 2016/0131232 | A1 | 5/2016 | Hoefken |
| 2016/0153535 | A1 | 6/2016 | Yang et al. |
| 2018/0363745 | A1 | 12/2018 | Hoefken |

* cited by examiner

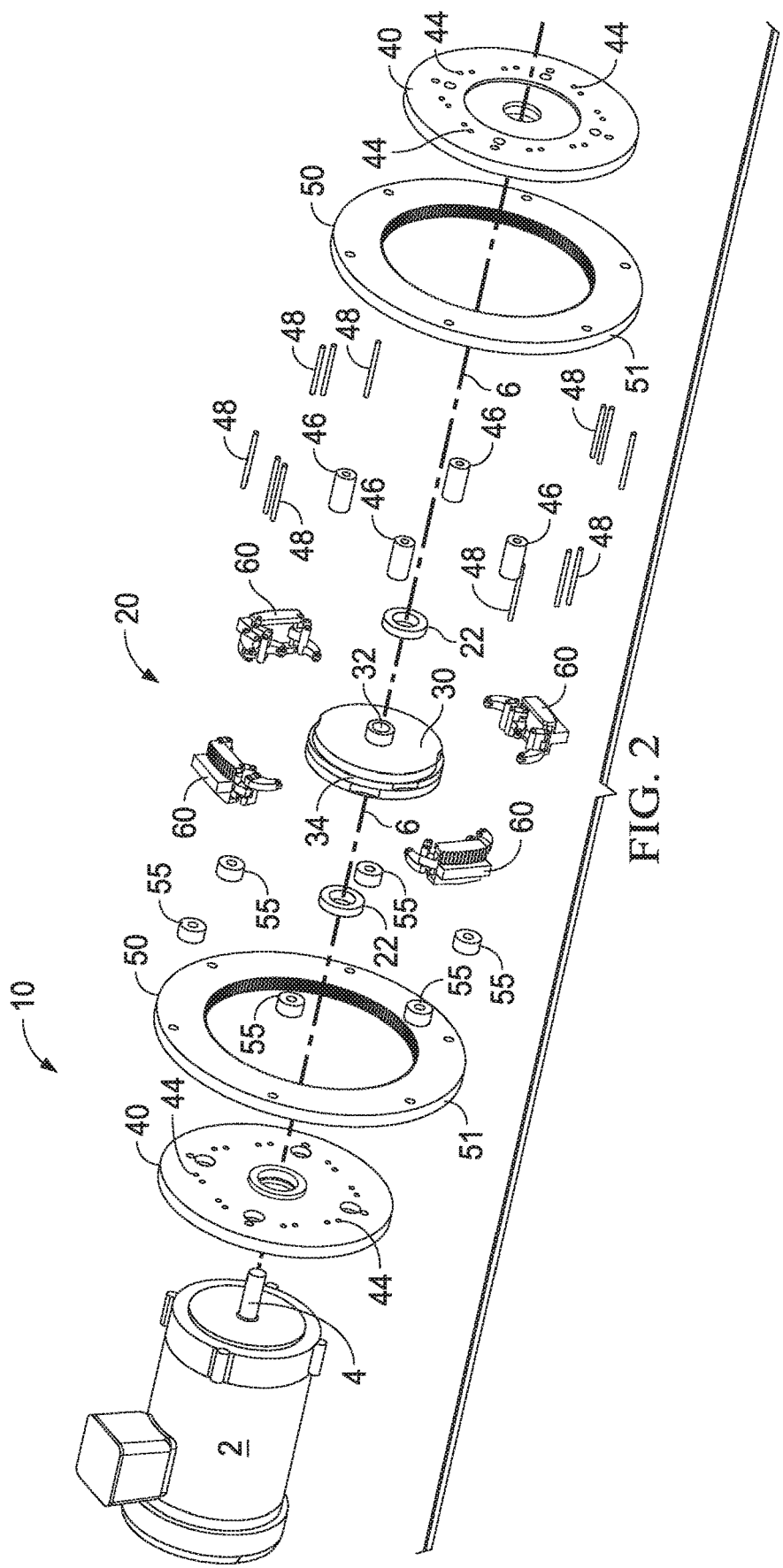

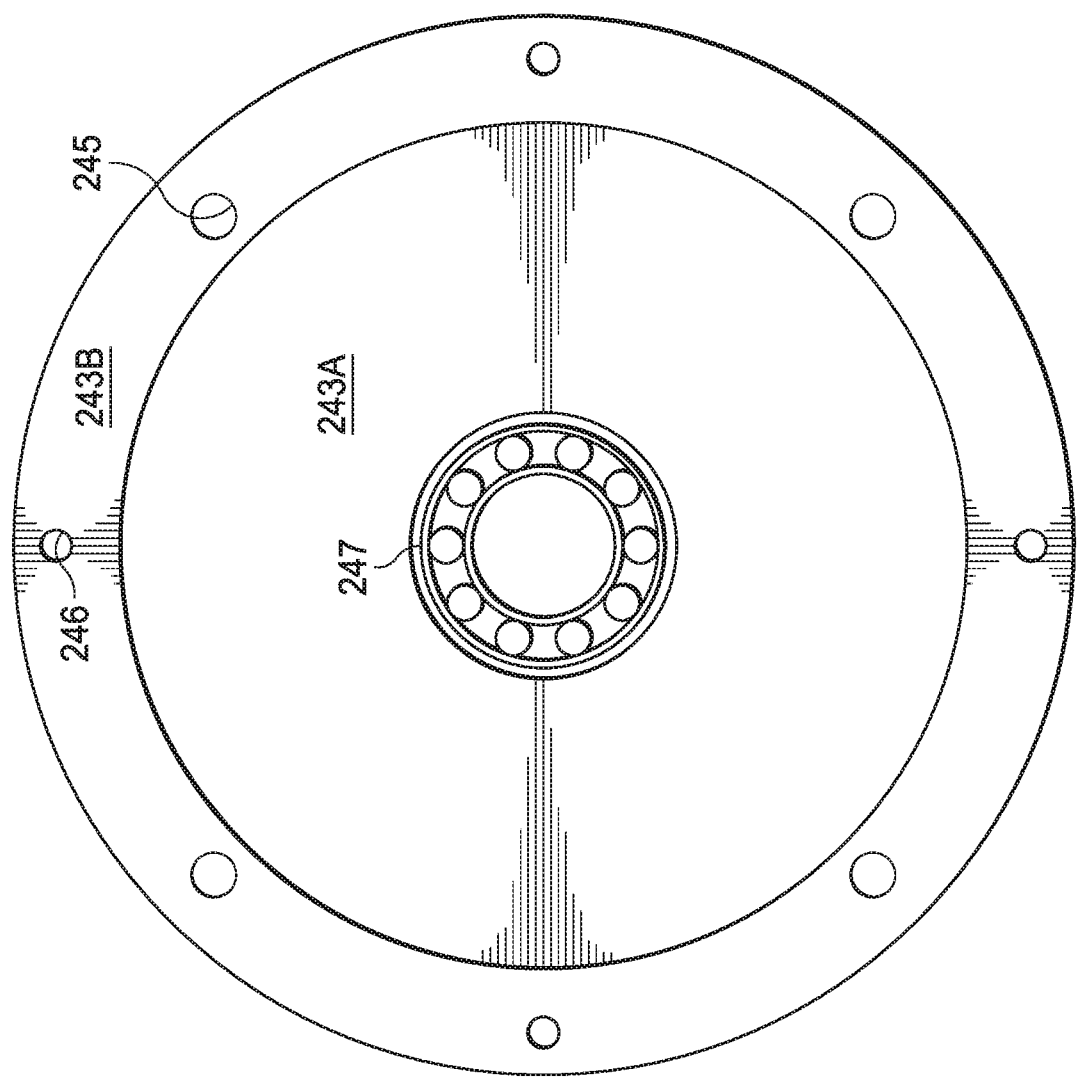

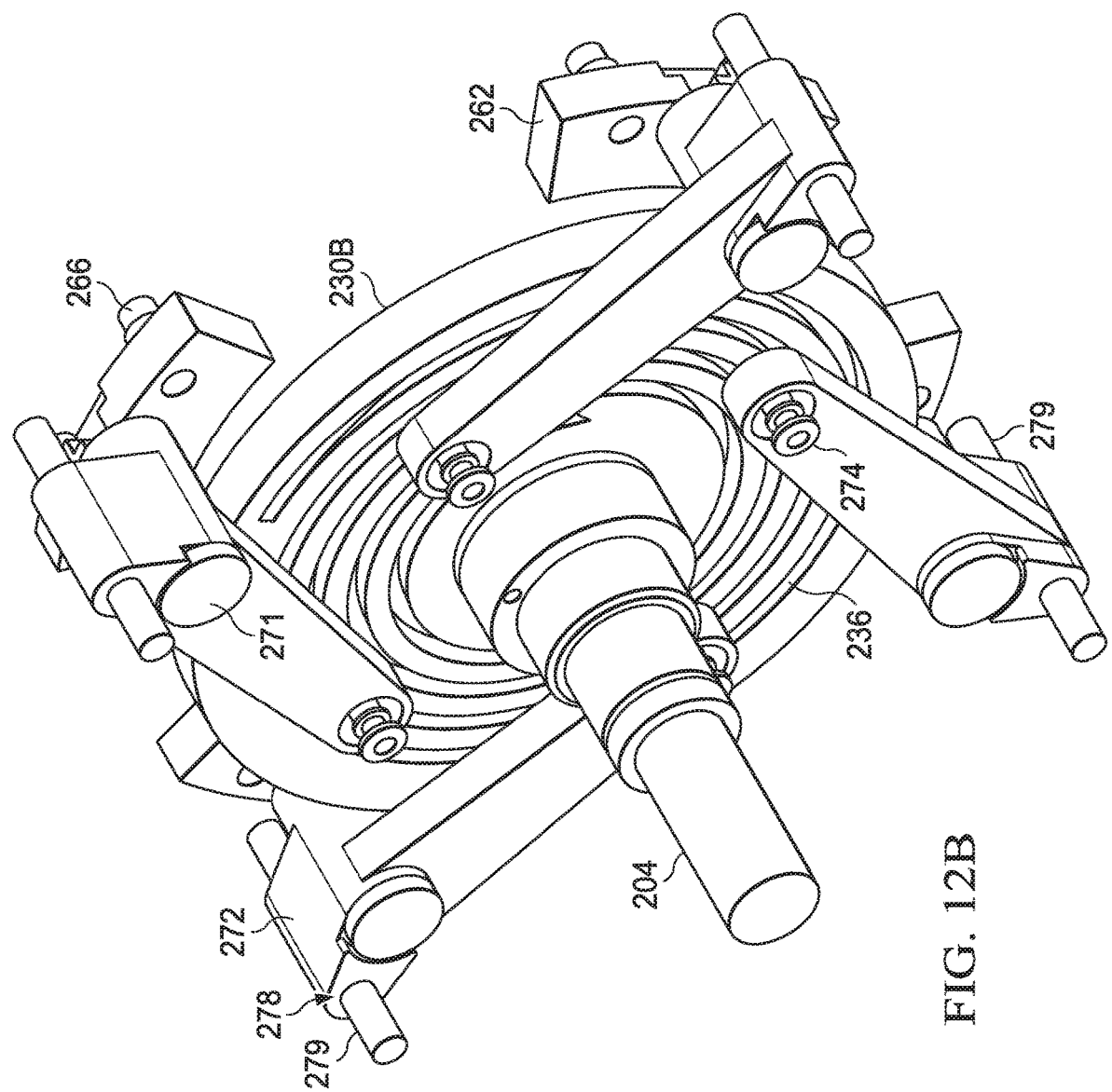

SPIRAL CAM GEARBOX MECHANISM

CROSS-REFERENCE TO RELATED APPLICATION

This application is a continuation of U.S. patent application Ser. No. 16/194,053, filed Nov. 16, 2018, which is a continuation-in-part application of U.S. patent application Ser. No. 14/995,094, filed on Jan. 13, 2016, which is a continuation application of U.S. patent application Ser. No. 13/795,488 filed Mar. 12, 2013 (now U.S. Pat. No. 9,261,176), the technical disclosure of which is hereby incorporated herein by reference.

BACKGROUND OF THE INVENTION

Technical Field of the Invention

The present invention relates to a universal gearbox mechanism featuring cam-actuated gear block assemblies that periodically engage the output gear causing power transfer. It has particular, but not exclusive, application for use in servomotor assemblies.

Description of the Related Art

Conventional machines typically consist of a power source and a power transmission system, which provides controlled application of the power. A variety of proposals have previously been made in the art of power transmission systems. The simplest transmissions, often called gearboxes to reflect their simplicity (although complex systems are also called gearboxes in the vernacular), provide gear reduction (or, more rarely, an increase in speed), sometimes in conjunction with a change in direction of the powered shaft. A transmission system may be defined as an assembly of parts including a speed-changing gear mechanism and an output shaft by which power is transmitted from the power source (e.g., electric motor) to an output shaft. Often transmission refers simply to the gearbox that uses gears and gear trains to provide speed and torque conversions from a power source to another device.

Gearboxes have been used for many years and they have many different applications. In general, conventional gearboxes comprise four main elements: power source; drive train; housing and output means. The power source places force and motion into the drive train. The power source may be a motor connected to the drive train through suitable gearing, such as a spur, bevel, helical or worm gear.

The drive train enables the manipulation of output motion and force with respect to the input motion and force provided by the power source. The drive train typically comprises a plurality of gears of varying parameters such as different sizes, number of teeth, tooth type and usage, for example spur gears, helical gears, worm gears and/or internal or externally toothed gears.

The gearbox housing is the means which retains the internal workings of the gearbox in the correct manner. For example, it allows the power source, drive train and output means to be held in the correct relationship for the desired operation of the gearbox. The output means is associated with the drive train and allows the force and motion from the drive train to be applied for an application. Usually, the output means exits the gearbox housing.

The output means typically can be connected to a body whereby the resultant output motion and force from the drive train is transmitted via the output means (e.g., an output shaft) to the body to impart the output mean's motion and force upon the body. Alternatively, the output means can impart the motion and force output from the drive train to the gearbox housing whereby the output means is held sufficiently as to allow the gearbox housing to rotate.

Rotating power sources typically operate at higher rotational speeds than the devices that will use that power. Consequently, gearboxes not only transmit power but also convert speed into torque. The torque ratio of a gear train, also known as its mechanical advantage, is determined by the gear ratio. The energy generated from any power source has to go through the internal components of the gearbox in the form of stresses or mechanical pressure on the gear elements. Therefore, a critical aspect in any gearbox design comprises engineering the proper contact between the intermeshing gear elements. These contacts are typically points or lines on the gear teeth where the force concentrates. Because the area of contact points or lines in conventional gear trains is typically very low and the amount of power transmitted is considerable, the resultant stress along the points or lines of contact is in all cases very high. For this reason, designers of gearbox devices typically concentrate a substantial portion of their engineering efforts in creating as large a line of contact as possible or create as many simultaneous points of contacts between the two intermeshed gears in order to reduce the resultant stress experienced by the respective teeth of each gear.

Another important consideration in gearbox design is minimizing the amount of backlash between intermeshing gears. Backlash is the striking back of connected wheels in a piece of mechanism when pressure is applied. In the context of gears, backlash (sometimes called lash or play) is clearance between mating components, or the amount of lost motion due to clearance or slackness when movement is reversed and contact is re-established. For example, in a pair of gears backlash is the amount of clearance between mated gear teeth.

Theoretically, backlash should be zero, but in actual practice some backlash is typically allowed to prevent jamming. It is unavoidable for nearly all reversing mechanical couplings, although its effects can be negated. Depending on the application it may or may not be desirable. Typical reasons for requiring backlash include allowing for lubrication, manufacturing errors, deflection under load and thermal expansion. Nonetheless, low backlash or even zero backlash is required in many applications to increase precision and to avoid shocks or vibrations. Consequently, zero backlash gear train devices are in many cases expensive, short lived and relatively heavy.

Weight and size are yet another consideration in the design of gearboxes. The concentration of the aforementioned stresses on points or lines of contact in the intermeshed gear trains necessitates the selection of materials that are able to resist those forces and stresses. However, those materials are oftentimes relatively heavy, hard and difficult to manufacture.

Thus, a need exists for an improved and more lightweight gearbox mechanism, which is capable of handling high stress loads in points or lines of contact between its intermeshed gears. Further, a need exists for an improved and more lightweight gearbox mechanism having low or zero backlash that is less expensive to manufacture and more reliable and durable.

SUMMARY OF THE INVENTION

The present invention overcomes many of the disadvantages of prior art gearbox mechanisms by utilizing a plurality of cam-actuated gear block assemblies to transfer power from a power shaft to a secondary or output gear element. Each gear block includes a gear block assembly having a surface that periodically interfaces with a secondary or output gear element. In a preferred embodiment the interface surface comprises a plurality of projections or teeth which correspond to complementary projections or gear teeth on the output gear element. Each gear block assembly further includes a plurality of linkage assemblies, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

Each linkage assembly comprises a linkage mechanism, which at its proximal end is pivotally attached end to its respective gear block and at its distal end maintains contact with its respective pathway or groove formed in the cam assembly. In a preferred embodiment, each linkage mechanism includes two pivotally coupled connector arms. An upper connector arm includes a first pivot point that is pivotally coupled to its respective gear block element and a second pivot point pivotally coupled to a lower connector arm. The lower connector arm includes a cam follower element at its distal end that maintains contact with its respective pathway or groove formed in the cam assembly. The lower connector arm further includes a pivot point having a fixed axis of rotation relative to the central axis of rotation of the cam assembly.

In a preferred embodiment, each gear block assembly includes three linkage assemblies pivotally coupled to the gear block and in constant contact with the cam assembly. The gear block includes pivot bars configured on opposing ends that serve to pivotally couple the linkage assemblies to the gear block. Two linkage assemblies are coupled to a pivot bar on one end while a single linkage assembly is coupled to the pivot bar on the opposing end. Each of the linkage assemblies includes a pivot point that is rotatively coupled to a fixed axis of rotation relative to the central axis of rotation of the cam assembly. In one embodiment, this fixed pivot point comprises a pivot bar fixably contained between two stationary plates. Each of the linkage assemblies is biased so that its respective cam follower element maintains contact with the surface of its respective pathway or groove formed in the cam assembly throughout the rotation cycle of the cam assembly.

The gear block assembly is designed to drive its respective gear block through a two-dimensional circuit in response to rotation of the cam assembly. Broadly speaking, the two-dimensional circuit includes urging the gear block to engage a secondary or output gear element and move or rotate a specified distance prior to disengaging from the output gear element, and returning back the specified distance to again reengage the secondary or output gear element once again and repeat the process. The travel path or circuit of each gear block is controlled by adjusting the length and configuration of the various linkage assemblies and altering the pathways or grooves formed in the cam assembly.

When adapted to a gearbox mechanism a plurality of gear block assemblies are configured about a central axis of the cam assembly. The cam assembly is rotatively coupled with a power source. As the cam assembly rotates, the cam follower elements of the respective linkage assemblies of each gear block assembly maintain contact with a particular pathway or groove formed in the circumferential surface of the cam assembly. The variance of distance from the center of rotation of the different pathways or grooves of the cam assembly causes the respective linkage assemblies to work in concert to move their respective gear block through a predetermined circuit of movement. This predetermined circuit of movement of the gear block can be precisely calibrated to meet specific engineering requirements. For example, the torque ratio and speed reduction may be regulated and controlled by adjusting the circuit of movement of each gear block assembly.

A second embodiment of a gearbox mechanism of the present invention may include a set of stationary plates, an output element, a plurality of pivot assemblies, torque block assemblies, and a cam assembly comprising a set of unique, corresponding cam elements arranged in a tandem configuration. Additionally, the gearbox mechanism may include a cam follower as part of the pivot assembly that follows the circuitous pathway formed in opposing interior surfaces of the tandem-configured cam elements. In a preferred embodiment, a portion of the pathway is generally spiral in shape. Each pivot assembly includes a pivot pin, a pivot lever, and a cam follower. The torque block assemblies are removably coupled to the pivot assemblies and are configured about a central axis. The rotation of the cam assembly (i.e., set of cam elements) drives the pivot assemblies and torque block assemblies.

By varying the radius of the pathway or groove in the cam elements, the cam actuated gear block assemblies drive respective torque block(s) through a three-dimensional circuit in response to rotation of the cam assembly. Broadly speaking, the three-dimensional circuit includes urging the torque block to engage the output element and move and/or rotate the output element a specified distance prior to disengaging from the output element and returning back the specified distance to again reengage the output element once again, and repeat the process. The travel path or circuit of each torque block is controlled by adjusting the length, width, height, and/or size of the respective gear block and/or torque lever and/or altering the pathways or grooves formed in the cam elements. In a preferred embodiment, there is at least one pivot point for both the torque block and the pivot lever that allows each to pivot separately from each other.

In at least one version, a central aperture aligned with a central axis may be a part of the gearbox mechanism. Each torque block assembly includes a torque block, a pivot lever, and at least one cam follower, which connect the torque block to the planer surface of the cam element. The pivot lever, and/or torque block can interact to be pivotally attached, and correspond to the interaction and/or engagement of the cam follower(s) with the cam element. The rotation of the output element may also be controlled through a reverse or tension engagement (i.e., negative bias) of gear block(s) that are not in a driving or positive bias rotational engagement in order to reduce and/or eliminate backlash.

In at least one version, the stationary plates provide a housing for the pivot assemblies. The torque block assemblies may pass through the main body stationary plate. The torque block(s) may also be retained and/or supported by the main body apertures. The pivot lever(s) may also be supported and/or retained by the stationary plates, and/or the void as defined by the stationary plates. The pivoting motion of the pivot lever can also coincide with a pivoting motion of the torque block that allows for the interfacing, engaging, and/or rotating of an output element.

Numerous embodiments of gearbox mechanisms are possible using the gear block assembly of the present invention.

The plurality of gear block assemblies configured about the central axis of the cam assembly can comprise either an odd or even number of gear block assemblies. At least two, and preferably three gear block assemblies are required for a gearbox mechanism of the present invention. The movement of the gear block assemblies typically move in a rotational series to one another. At least one gear block assembly is always engaged with the output gear element at any particular instance in time. Preferably, only one gear block assembly is disengaged with the output gear element at any particular instance in time. However, in another preferred embodiment wherein the plurality of gear block assemblies comprises four or more even-numbered gear block assemblies, the gear block assemblies configured on opposing sides of the cam assembly engage and disengage in unison from the secondary or output gear element.

The design of the gear block assemblies of the present invention enable a greater number of gear teeth to engage the output gear at any given time, thereby spreading the stresses associated therein across a greater area. By dramatically increasing the contact area between the gear block and the output gear at any given time the mechanical stress level is significantly decreased. In addition, the gear block assemblies of the present invention reduce backlash to zero and even preloaded conditions to create a tight connection between the power source and the powered device. This is an extremely desirable feature especially for high vibration applications. By reducing backlash to zero or preloaded condition, the mechanical impedance may also be reduced at a broad range of high vibration frequencies. Moreover, because the stresses associated with engagement of the gear block against the output gear are distributed across a greater area, the gear block mechanism may be manufactured of lighter weight, more flexible materials, which are less expensive and easier to manufacture, with no degradation in reliability. Indeed, using flexible materials further reduces the mechanical impedance at low frequencies. By reducing its weight and size, the gearbox mechanism of the present invention is adaptable to a broad range of applications that were previously impractical because of weight and space limitations.

BRIEF DESCRIPTION OF THE DRAWINGS

A more complete understanding of the method and apparatus of the present invention may be had by reference to the following detailed description when taken in conjunction with the accompanying drawings, wherein:

FIG. 2 is an exploded perspective view thereof;

FIG. 10A is a front view of an outer stationary plate;

FIG. 12B is a perspective view of one half of a cam assembly coupled with torque block assemblies of the spiral gear block mechanism.

Figure 1A:
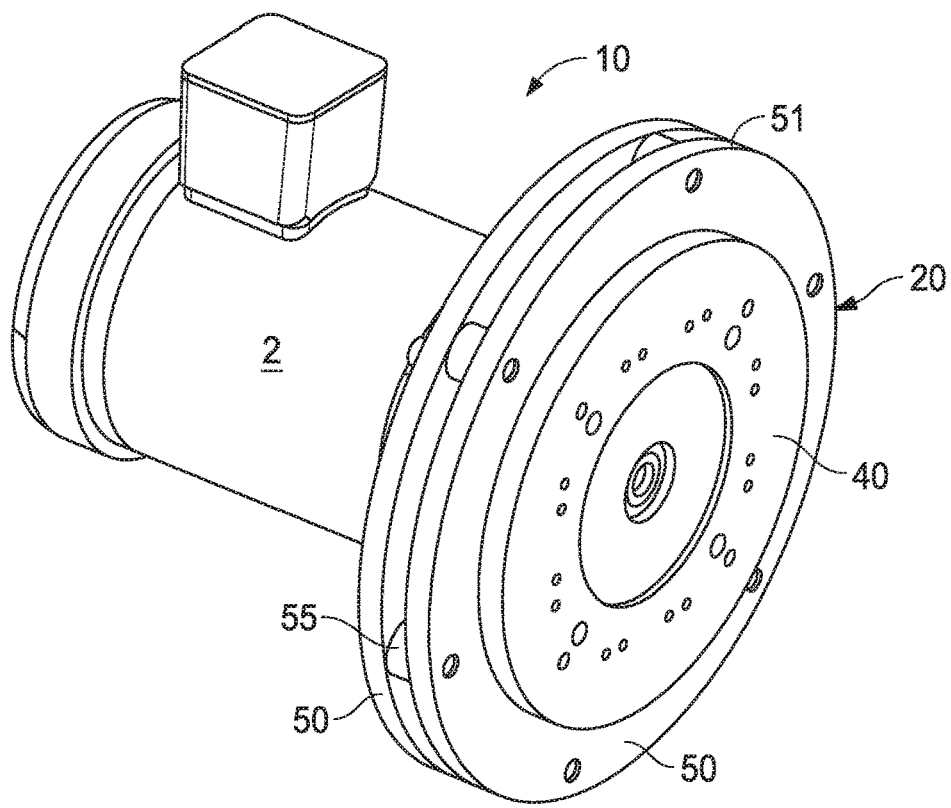
FIG. 1A is a perspective view of an embodiment of the gearbox mechanism of the present invention attached to a power source.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1B:
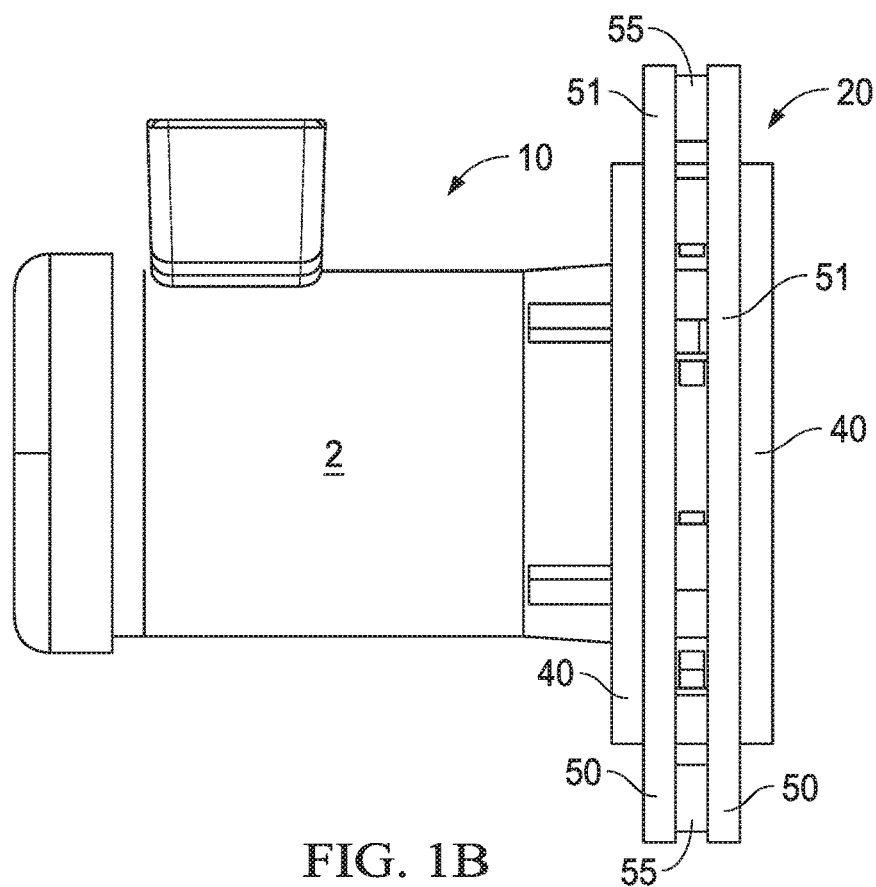
FIG. 1B is a side elevation view thereof.

With reference to the Figures, and in particular FIGS. 1A, 1B and 2, an embodiment of a machine 10 utilizing the gearbox mechanism 20 of the present invention is depicted. The machine 10 includes a power source or actuator 2, which includes an output device 4 that transmits the power generated by the power source 2. While the embodiment shown in the Figure generally depicts the power source 2 as an electric motor and the output device 4 as an output shaft of the electric motor, it is understood that there are numerous possible embodiments. For example, output device 4 need not be directly connected to the power source 2 but may be rotatively coupled by means of gears, chains, belts or magnetic fields. Likewise, the power source 2 may comprise an electric motor, an internal combustion engine, or any conventional power source that can be adapted to generate rotative power in an output device 4. Moreover, the power source 2 may also comprise the output gear of a preceding gear train mechanism.

The output device 4 comprises a central shaft that connected to the gearbox mechanism 20 through a central aperture 32 in the cam assembly 30 of the gearbox mechanism 20. The gearbox mechanism 20 is configured about the central axis 6 of the central shaft of the output device and comprises two stationary plates 40 between which are configured an output or power gear 50, a cam assembly 30 and a plurality of cam-actuated gear block assemblies 60, which transfer power from the cam assembly 30 to an output or power gear element 50. Two bearing assemblies 22 isolate the cam assembly 30 from the stationary plates 40 so that the cam assembly 30 can rotate freely between the two stationary plates 40. Likewise, spacer elements 46 configured between the two stationary plates 40 ensure that movement of the power gear element 50 is not impeded by the stationary plates 40. The gear block assemblies 60 are evenly spaced about the circumference of the cam assembly 30. Each gear block assembly 60 includes a gear block 62 and a plurality of linkage assemblies, which connect the gear block 62 to the outer circumferential surface of the cam assembly 30. Each linkage assembly comprises a linkage mechanism, which at its proximal end is pivotally attached to its respective gear block 62 and at its distal end includes a cam follower element, which maintains contact with its respective pathway or groove formed in the circumferential surface 34 of the cam assembly 30. Each linkage assembly includes a fixed axis pivot point that is connected to the two stationary plates 40. While each linkage assembly can pivot about its respective fixed axis pivot point 48 the alignment and configuration of the pivot point remains fixed in relation to the two stationary plates 40.

As shown in the embodiment depicted in the Figures, the plurality of cam-actuated gear block assemblies 60 transfer power from the power shaft 4 to an annular secondary or output gear element 50. In a preferred embodiment, each gear block assembly 60 includes a gear block 62 having an interface surface 63 (e.g., a plurality of projections or teeth 66) which correspond to a complementary interface surface 54 (e.g., projections or gear teeth) configured on an inner circumferential surface 53 of the annular secondary or output gear element 50. It is understood that the interface between the gear block 62 and the inner circumferential surface 53 of the output gear element 50 of the present invention comprises not only the preferred gear teeth as depicted, but also any complementary arrangement such as pins and holes or even friction fit surfaces.

While the annular output or power gear element 50 is depicted as two circular rings held apart by spacer elements 55, it is understood that the output or power gear element 50 may comprise a single circular ring. The output or power gear element 50 includes apertures or holes 58 for attaching to an output shaft or power takeoff (not shown). In addition, it is understood that the outer circumference 51 of the output or power gear element 50 may also comprise a surface to interface with some other gear train mechanism.

In addition, it is understood that the gear block 62 may include a divider/alignment block 68 dividing the interface surface 63 into two separate sections. The variant of the gear block 62 featuring the alignment block 68 is particularly suitable to embodiments which feature output or power gear elements 50 comprised of two circular rings.

The gear blocks 62 of the present invention are specifically designed to enable a greater surface area (e.g., greater number of gear teeth) to engage the output gear 50 at any given time, thereby spreading the stresses associated therein across a greater area. By dramatically increasing the contact area between the gear block 62 and the output gear 50 at any given time the mechanical stress level is significantly decreased. In addition, the gear block 62 assemblies of the present invention reduce backlash to zero and even preloaded conditions to create a tight connection between the power source 2 and the powered device. This is an extremely desirable feature especially for high vibration applications. Moreover, because the stresses associated with engagement of the gear block 62 against the output gear 50 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam assembly 30 is coupled to the power source 2 by means of the output device or power shaft 4. Thus, power generated by the power source 2 is transferred to the power shaft 4, which causes the cam assembly 30 to rotate about the central axis 6. The cam assembly 30 includes about its circumferential surface 34 a plurality of unique pathways or grooves which each interface with the cam follower element of a single linkage assembly of each gear block assembly 60 so that as the cam assembly 30 rotates, the movement of the gear block 62 is controlled in two dimensions in accordance with a certain design parameter. By varying the radius of the pathway or grooves on the cam assembly 30 the linkage assemblies of the gear block assembly 60 drive respective gear block 62 through a two-dimensional circuit in response to rotation of the cam assembly 30. Broadly speaking, the two-dimensional circuit includes urging the gear block to engage the output gear element 50 and move or rotate the output gear element 50 a specified distance prior to disengaging from the output gear element 50, and returning back the specified distance to again reengage the output gear element 50 once again and repeat the process. The travel path or circuit of each gear block 62 is controlled by adjusting the length and configuration of the various linkage assemblies and altering the pathways or grooves formed in the cam assembly 30.

In a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam assembly 30. The lower connector arm further includes a pivot point having a fixed axis of rotation relative to the central axis 6 of rotation of the cam assembly 30.

With reference now to FIGS. 4A-4D, a preferred embodiment of the gear block assembly 60 is shown. In the depicted preferred embodiment, each gear block assembly 60 includes three linkage assemblies 70, 80, 90, which are each pivotally coupled to the gear block 62 and include a cam follower element 74, 84, 94, respectively, which maintain constant contact with the cam assembly 30. The gear block 62 includes pivot bars configured on opposing ends that serve to pivotally couple the linkage assemblies 70, 80, 90 to the gear block 62. For example, two linkage assemblies 70, 80 are pivotally coupled to a pivot bar 64a on one end while a single linkage assembly 90 is pivotally coupled to the pivot bar 64b on the opposing end. Each of the linkage assemblies 70, 80, 90 includes a pivot point 78, 88, 98, respectively, that is rotatively coupled to a fixed axis of rotation relative to the central axis 6 of rotation of the cam assembly 30. As depicted, each fixed axis of rotation comprises a pivot pin 48 that is secured in matching alignment holes 44 configured in the two stationary plates 40. While each of the linkage assemblies 70, 80, 90 can pivot about its respective fixed axis pivot point 78, 88, 98, respectively, the alignment and configuration of the pivot points remains fixed in relation to the two stationary plates 40. Each of the linkage assemblies 70, 80, 90 is biased so that its respective cam follower element 74, 84, 94, respectively, maintains contact with the surface of its respective pathway or groove formed in the cam assembly 30 throughout the rotation cycle of the cam assembly 30.

In the depicted preferred embodiment, each of the linkage assemblies may further comprise at least two connector arms. For example, the first linkage assembly 70 may include a lower connector arm 72 that is pivotally connected to an upper connector arm 74, which is also pivotally connected to the gear block 62. A pivot pin 71 serves to pivotally connect the lower connector arm 72 to the upper connector arm 74. The lower connector arm 72 includes a cam follower element 74 at its distal end. In a preferred embodiment the cam follower element 74 comprises a bearing wheel 75 rotatively coupled at the distal end of the lower connector arm by means of an axle 76. The lower connector arm 72 further includes a pivot point 78 that is rotatively coupled to a fixed axis of rotation relative to the central axis 6 of rotation of the cam assembly 30. For example, a pivot pin 48a secured in matching alignment holes 44 configured in the two stationary plates 40 serves as a fixed axis of rotation relative to the central axis 6 of rotation of the cam assembly 30. While the lower connector arm 72 may pivot about its fixed axis pivot point 78, the alignment and configuration of the pivot point 78 remains fixed in relation to the two stationary plates 40. Each of the pivotal connections in the first linkage assembly 70 is biased so that the cam follower element 74 maintains contact with the surface of its respective pathway or groove 36 formed in the circumferential surface 34 of the cam assembly 30 throughout the rotation cycle of the cam assembly 30. For example, the pivotal connections may further include torsional spring elements (not shown) which bias the first linkage assembly 70 so that the cam follower element 74 maintains contact with the surface of its respective pathway or groove 36 formed in the circumferential surface 34 of the cam assembly 30 throughout the rotation cycle of the cam assembly 30. Alternatively, the cam follower element of each linkage assembly may include conjugate cams to bias the pivotal connections in the linkage assembly. Alternatively or in addition, a ring spring connecting all of the gear blocks 62 in a gear train may be used as a biasing mechanism in accordance with the present invention.

Similarly, the second linkage assembly 80 may include a lower connector arm 82 that is pivotally connected to an upper connector arm 84, which is also pivotally connected to the gear block 62. The upper connector arm 84 is pivotally connected to the gear block 62 by means of the same pivot bar 64a used to pivotally connect the upper connector arm 74 of the first linkage assembly 70. A pivot pin 81 serves to pivotally connect the lower connector arm 82 to the upper connector arm 84. The lower connector arm 82 includes a cam follower element 84 at its distal end. In a preferred embodiment the cam follower element 84 comprises a bearing wheel 85 rotatively coupled at the distal end of the lower connector arm by means of an axle 86. The lower connector arm 82 further includes a pivot point 88 that is rotatively coupled to a fixed axis of rotation relative to the central axis 6 of rotation of the cam assembly 30. For example, a pivot pin 48b secured in matching alignment holes 44 configured in the two stationary plates 40 serves as a fixed axis of rotation relative to the central axis 6 of rotation of the cam assembly 30. While the lower connector arm 82 may pivot about its fixed axis pivot point 88, the alignment and configuration of the pivot point 88 remains fixed in relation to the two stationary plates 40. Each of the pivotal connections in the second linkage assembly 80 is biased so that the cam follower element 84 maintains contact with the surface of its respective pathway or groove 37 formed in the circumferential surface 34 of the cam assembly 30 throughout the rotation cycle of the cam assembly 30. For example, the pivotal connections may further include torsional spring elements (not shown) which bias the second linkage assembly 80 so that the cam follower element 84 maintains contact with the surface of its respective pathway or groove 37 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Likewise, the third linkage assembly 90 may include a lower connector arm 92 that is pivotally connected to an upper connector arm 94, which is also pivotally connected to the gear block 62. The upper connector arm 94 of the third linkage assembly 90 is pivotally coupled to a pivot bar 64b configured on the opposing end of the gear block 62 as the pivot bar 64a to which the upper connector arms 74, 84 of the first and second linkage assemblies 70, 80 are rotatively coupled. A pivot pin 91 serves to pivotally connect the lower connector arm 92 to the upper connector arm 94. The lower connector arm 92 includes a cam follower element 94 at its distal end. In a preferred embodiment the cam follower element 94 comprises a bearing wheel 95 rotatively coupled at the distal end of the lower connector arm by means of an axle 96. The lower connector arm 92 further includes a pivot point 98 that is rotatively coupled to a fixed axis of rotation relative to the central axis 6 of rotation of the cam assembly 30. For example, a pivot pin 48c secured in matching alignment holes 44 configured in the two stationary plates 40 serves as a fixed axis of rotation relative to the central axis 6 of rotation of the cam assembly 30. While the lower connector arm 92 may pivot about its fixed axis pivot point 98, the alignment and configuration of the pivot point 98 remains fixed in relation to the two stationary plates 40. Each of the pivotal connections in the second linkage assembly 90 is biased so that the cam follower element 94 maintains contact with the surface of its respective pathway or groove 38 formed in the circumferential surface 34 of the cam assembly 30 throughout the rotation cycle of the cam assembly 30. For example, the pivotal connections may further include torsional spring elements (not shown) which bias the second linkage assembly 90 so that the cam follower element 94 maintains contact with the surface of its respective pathway or groove 38 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Figure 5:
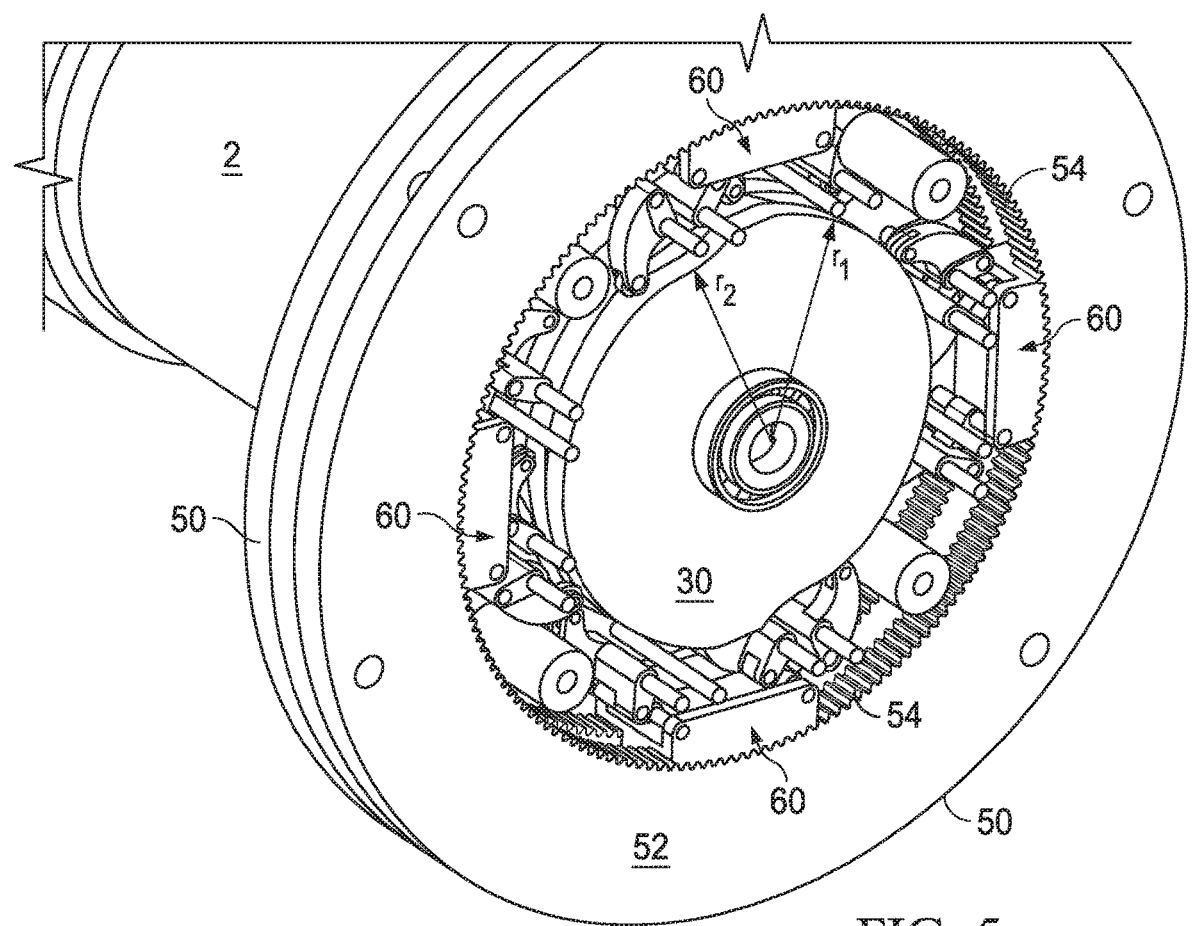
FIG. 5 is a perspective view of the embodiment of the gearbox mechanism shown in FIG. 3A.
Figure 6:
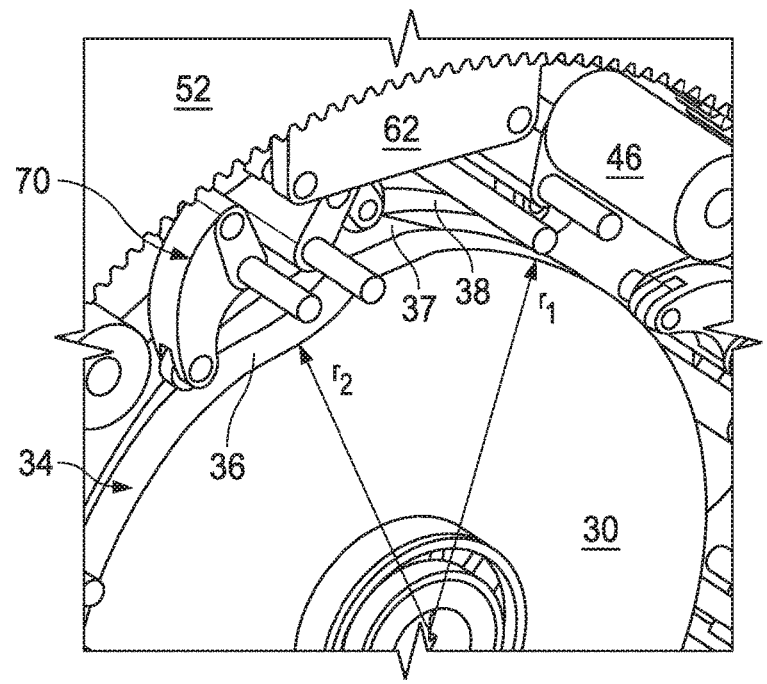
FIG. 6 is a close-up perspective view of a gear block assembly shown in FIG. 5.

Each of the linkage assemblies 70, 80, 90 is biased so that its respective cam follower element 74, 84, 94 maintains contact with the surface of its respective pathway or groove formed in the cam assembly 30 throughout the rotation cycle of the cam assembly 30. For example, cam follower element 74 maintains contact with the surface of a first pathway 36, cam follower element 84 maintains contact with the surface of a second pathway 37, and cam follower element 94 maintains contact with the surface of a third pathway 38. Each pathway has a unique circumference, the radius of which varies over the course of the pathway. Thus, for example as shown in FIGS. 5 and 6, the first pathway 36 has a first radius $r_1$ at one part of its circumference that is greater than a second radius $r_2$ at another part of its circumference. This creates a unique, undulating path for each pathway as the cam assembly 30 rotates. While the cam assembly 30 depicted in the Figures, appears to be a single disc or unit having a plurality of pathways or grooves formed in the circumferential surface 34 of the cam assembly 30, it is understood that the cam assembly 30 may also comprise a plurality of separate discs, each having a unique pathway formed in its circumferential surface, which are mechanically coupled to one another to assemble a single cam assembly 30.

As the cam assembly 30 rotates, the cam follower element follows its respective pathway maintaining contact with the circumferential surface of the respective pathway. As the radius of the pathway changes, the respective linkage assembly pivots about its fixed axis pivot point to compensate. This pivoting of the linkage assembly about its fixed axis pivot point induces similar movement in the pivotal connection with the gear block 62, which results in movement of the gear block 62. Thus, as the cam assembly 30 rotates, the movement of the gear block 62 is controlled by the induced pivoting of the plurality linkage assemblies. For example, by varying the radius of the first pathway or groove 36 on the cam assembly 30, the first linkage assembly 70 pivots about its fixed axis pivot point 78 to compensate and maintain contact between the first cam follower 74 and the surface of the first pathway or groove 36. This pivoting of the first linkage assembly 70 about its fixed axis pivot point 78 induces movement in the pivotal connection with the gear block 62. Each linkage assembly acts independently of the other linkage assemblies due to the cam follower element of each linkage assembly following a distinct pathway formed in the circumferential surface of the cam assembly.

Figure 4A:
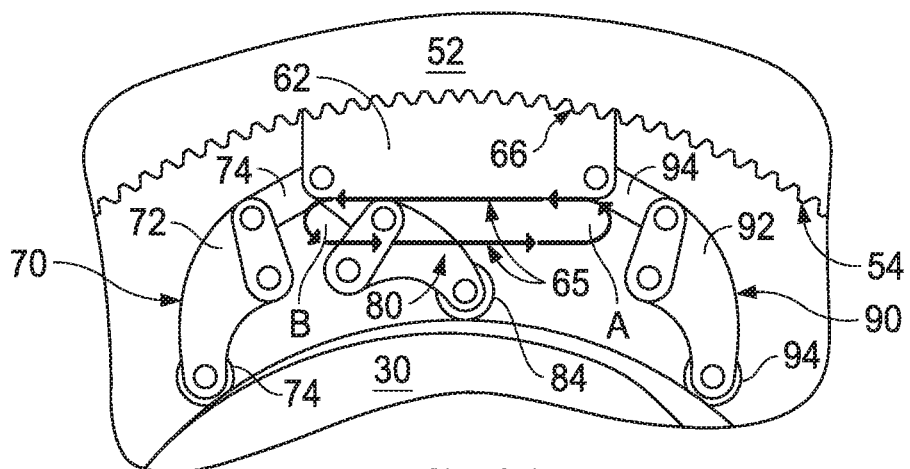
FIG. 4A is a close-up side elevation view of a gear block assembly shown in FIG. 3A.
Figure 4B:
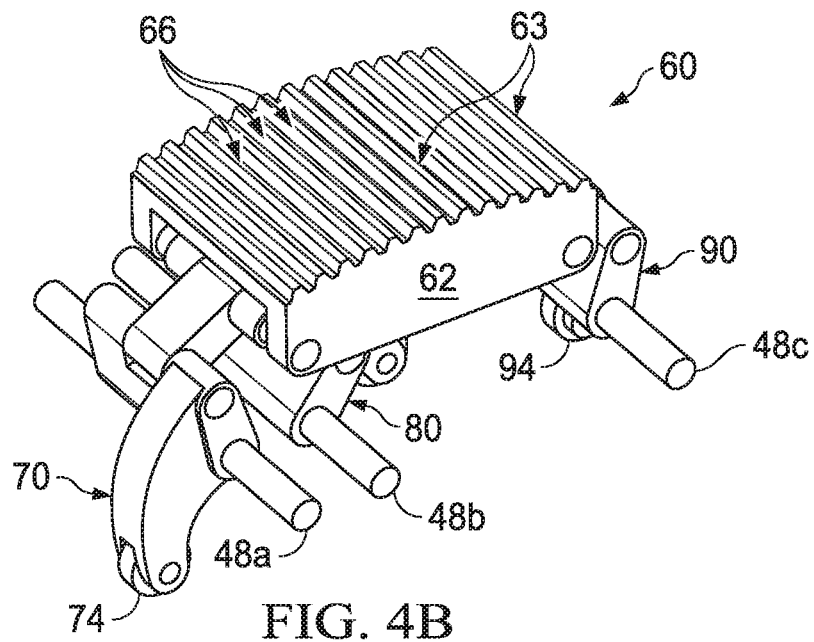
FIG. 4B is a perspective view of a gear block assembly shown in FIG. 3A.
Figure 4C:
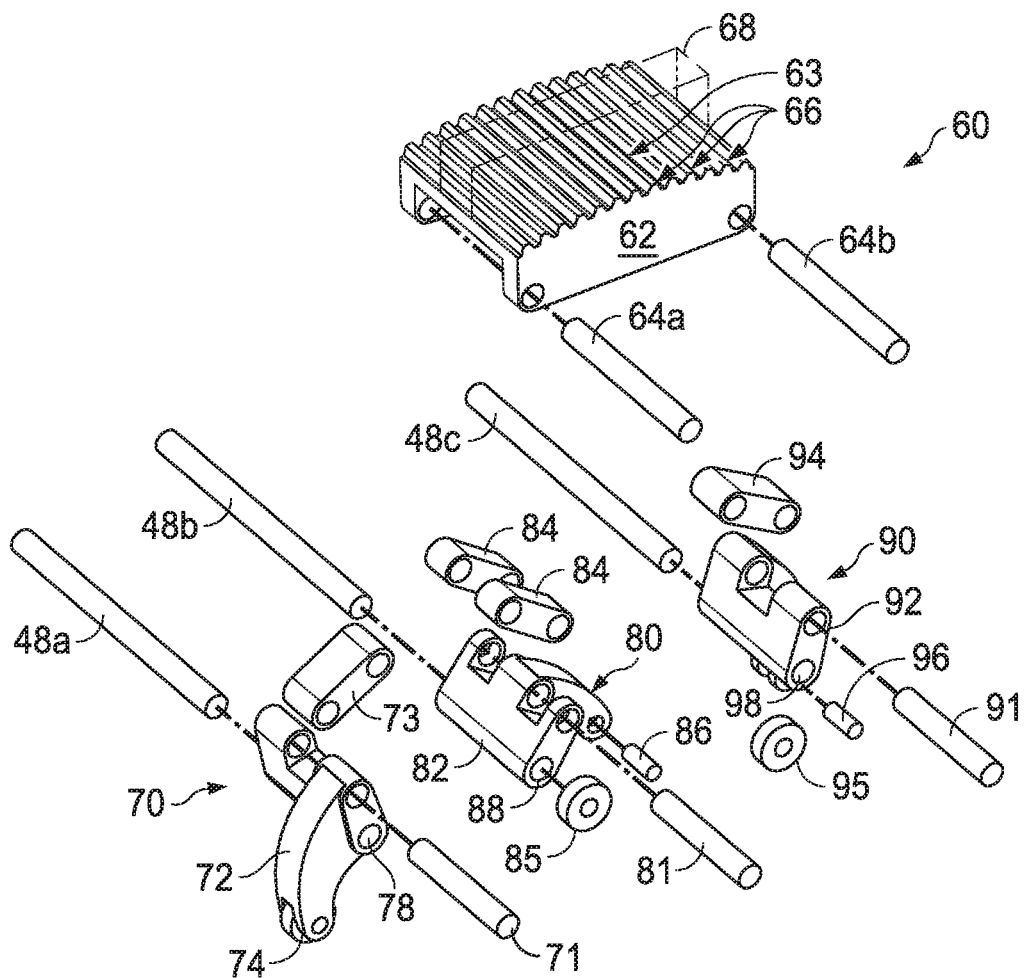
FIG. 4C is an exploded perspective view thereof.
Figure 4D:
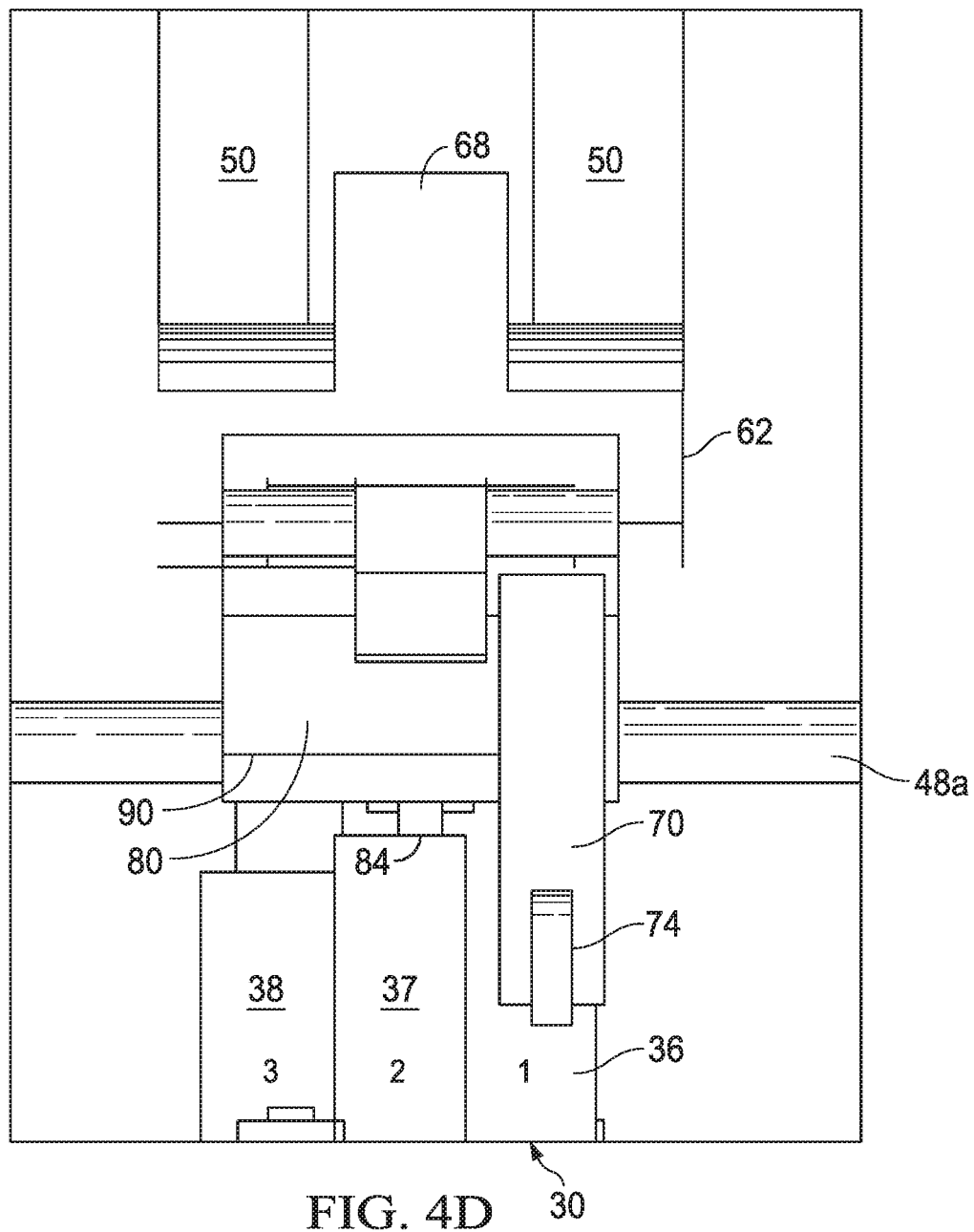
FIG. 4D is close-up cross-sectional view of a gear block assembly shown in FIG. 4A engaged with an output gear.

By varying the radius of each pathways or grooves 36, 37, 38 on the cam assembly 30, linkage assemblies 70, 80, 90 drive their respective gear block 62 through a two-dimensional circuit in response to rotation of the cam assembly 30. As shown in FIG. 4A, in general, the two-dimensional circuit 65 includes urging the gear block to engage the output gear element 50 and move or rotate the output gear element 50 a specified distance prior to disengaging from the output gear element 50, and returning back the specified distance to again reengage the output gear element 50 once again and repeat the process. It is understood that the two-dimensional circuit 65 depicted in the drawings is not to scale and is somewhat exaggerated to illustrate the general principal of the invention. For example, the distance A-B would typically be much smaller than depicted. The travel path or circuit 65 of each gear block 62 is controlled by adjusting the length and configuration of the various linkage assemblies and altering the pathways or grooves formed in the cam assembly 30.

When adapted to a gearbox mechanism 20, a plurality of gear block assemblies 60 are configured about the central axis 6 of the cam assembly 30. The cam assembly 30 is coupled with a power source 2 by means of output device 6. As the cam assembly 30 rotates, the cam follower elements (e.g., 74, 84, 94) of the respective linkage assemblies (e.g., 70, 80, 90) of each gear block assembly 60 maintain contact with a particular pathway or groove (e.g., 36, 37, 38) formed in the circumferential surface 34 of the cam assembly 30. The variance of distance from the center of rotation of the different pathways or grooves (e.g., 36, 37, 38) of the cam assembly 30 causes the linkage assemblies pivotally attached to its respective gear block 60 to work in concert to move their respective gear block through a predetermined circuit of movement 65. This predetermined circuit of movement 65 of the gear block 60 can be precisely calibrated to meet specific engineering requirements. For example, the torque ratio and speed reduction may be regulated and controlled by adjusting the circuit of movement 65 of each gear block assembly 60.

Figure 7A:
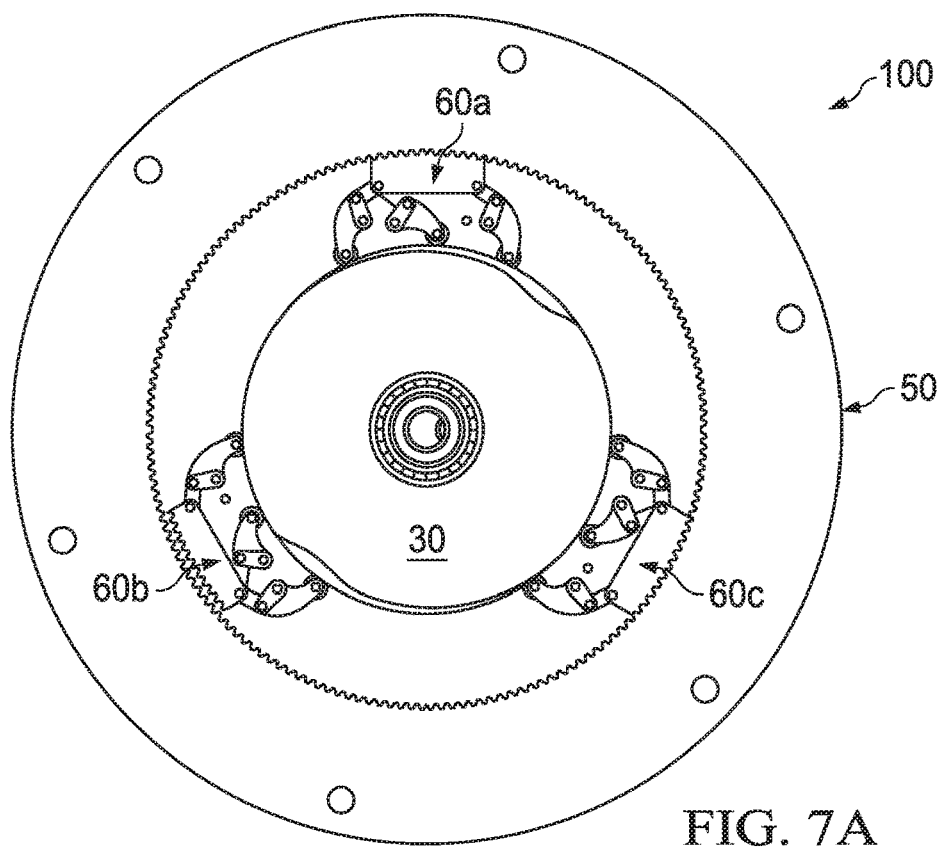
FIGS. 7A-7C are end views with the outer stationary plate removed of different embodiments of the gearbox mechanism of the present inventions.
Figure 7B:
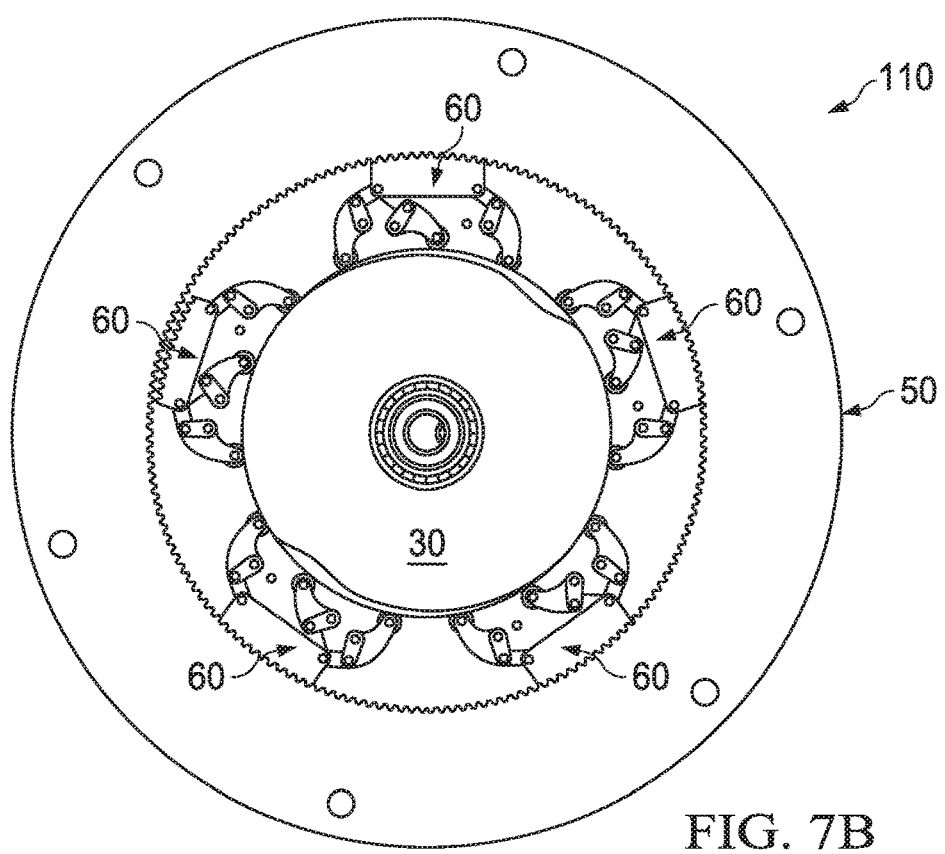

Numerous embodiments of gearbox mechanisms are possible using the gear block assembly 60 of the present invention. All embodiments of gearbox mechanisms constructed in accordance with the present invention feature a plurality of gear block assemblies 60 configured about the central axis 6 of the cam assembly 30 and may comprise either an odd or even number of gear block assemblies 60. At least two, and preferably three gear block assemblies are required for a gearbox mechanism of the present invention. For example, as shown in FIG. 7A, an embodiment of the gearbox mechanism 100 featuring three gear block assemblies 60 is depicted. FIG. 7B depicts an embodiment of the gearbox mechanism 110 featuring five gear block assemblies 60. The movement of the gear block assemblies 60 typically moves in a rotational series to one another.

Figure 3:
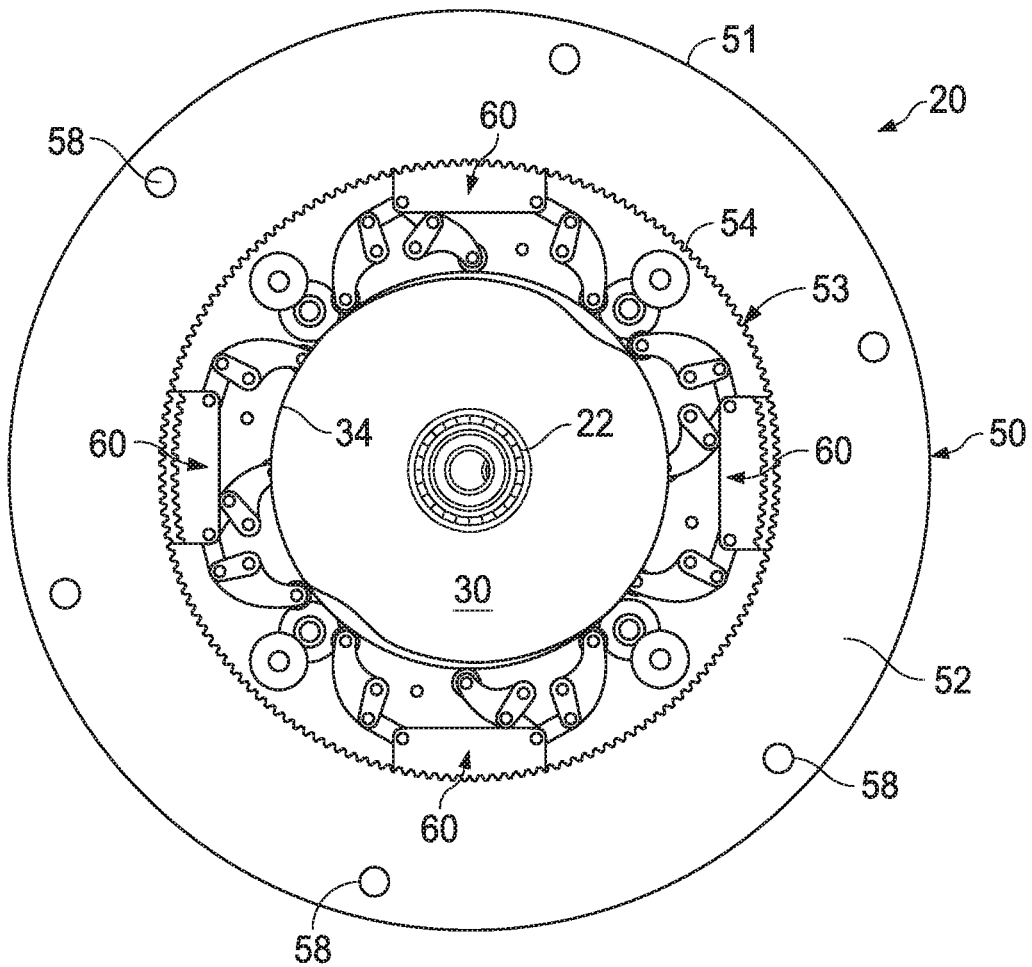
FIG. 3 is an end view thereof with the outer stationary plate removed.
Figure 7C:
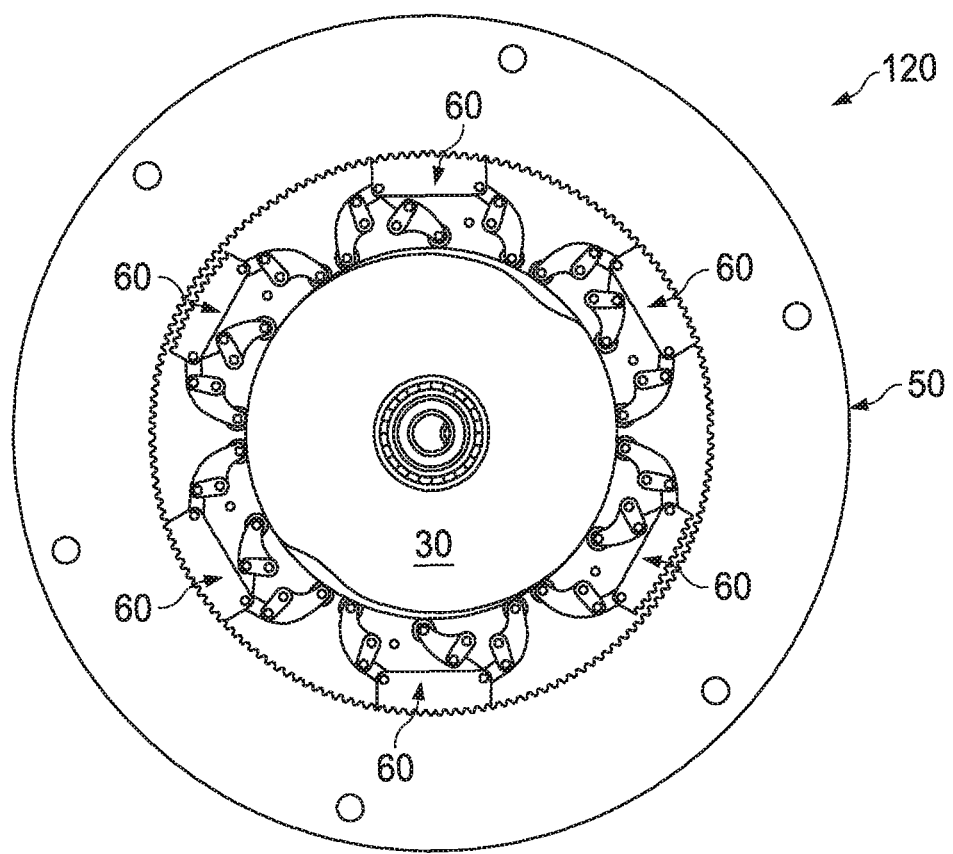

However, in a preferred embodiment of the present invention wherein the plurality of gear block assemblies comprises four or more even-number gear block assemblies 60, the gear block assemblies 60 configured on opposing sides of the cam assembly 30 engage and disengage in unison from the secondary or output gear element 50. For example as shown in FIG. 3, an embodiment of the gearbox mechanism 20 featuring four gear block assemblies 60 is depicted. Similarly, FIG. 7C depicts an embodiment of the gearbox mechanism 120 featuring six gear block assemblies 60. This is accomplished by ensuring that the individual pathways or grooves formed in the circumferential surface of the cam assembly are in phase with one another on opposing sides of the cam assembly circumference.

Figure 8:
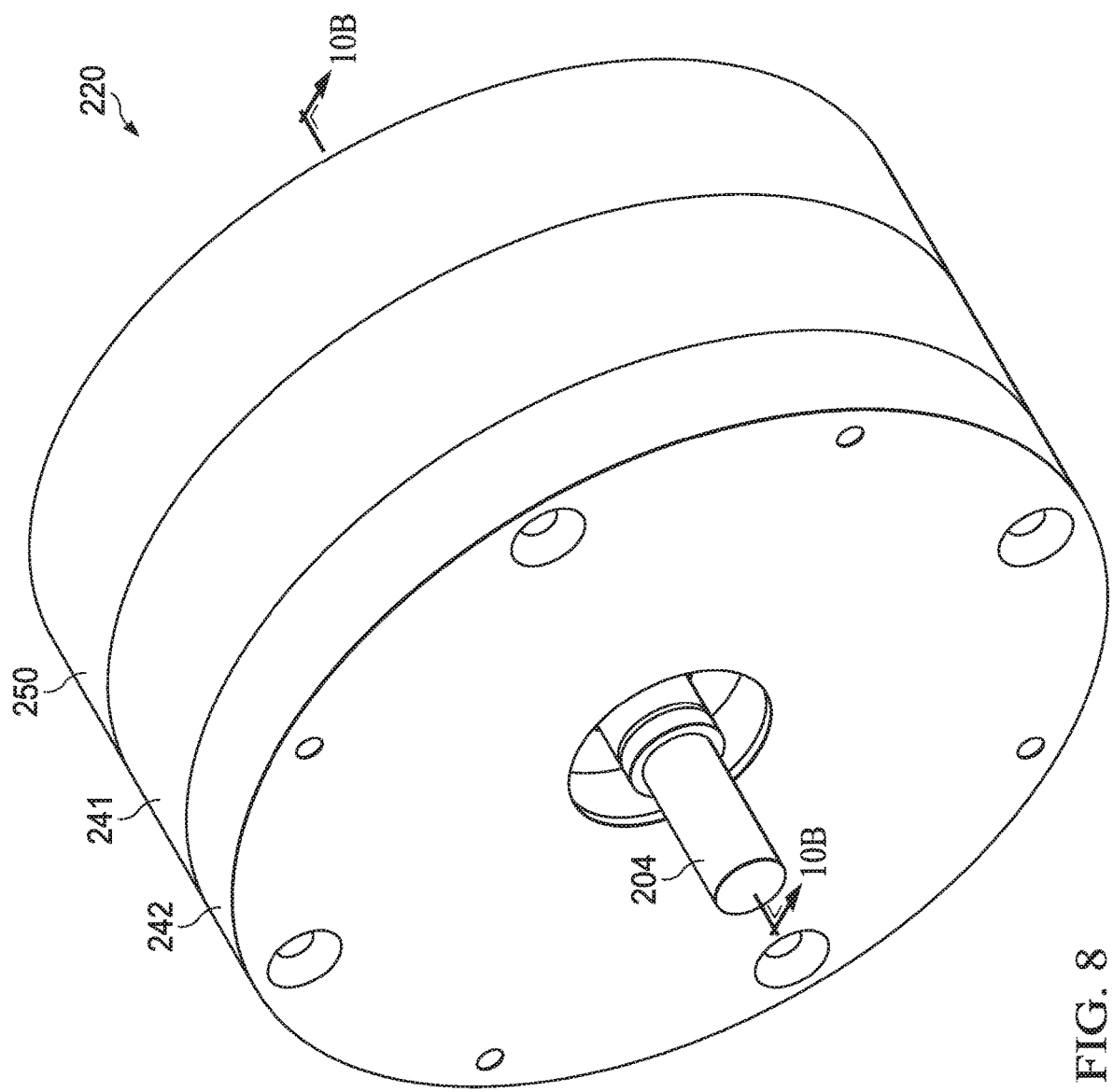
FIG. 8 is a perspective view of the gearbox mechanism of the present invention.
Figure 9:
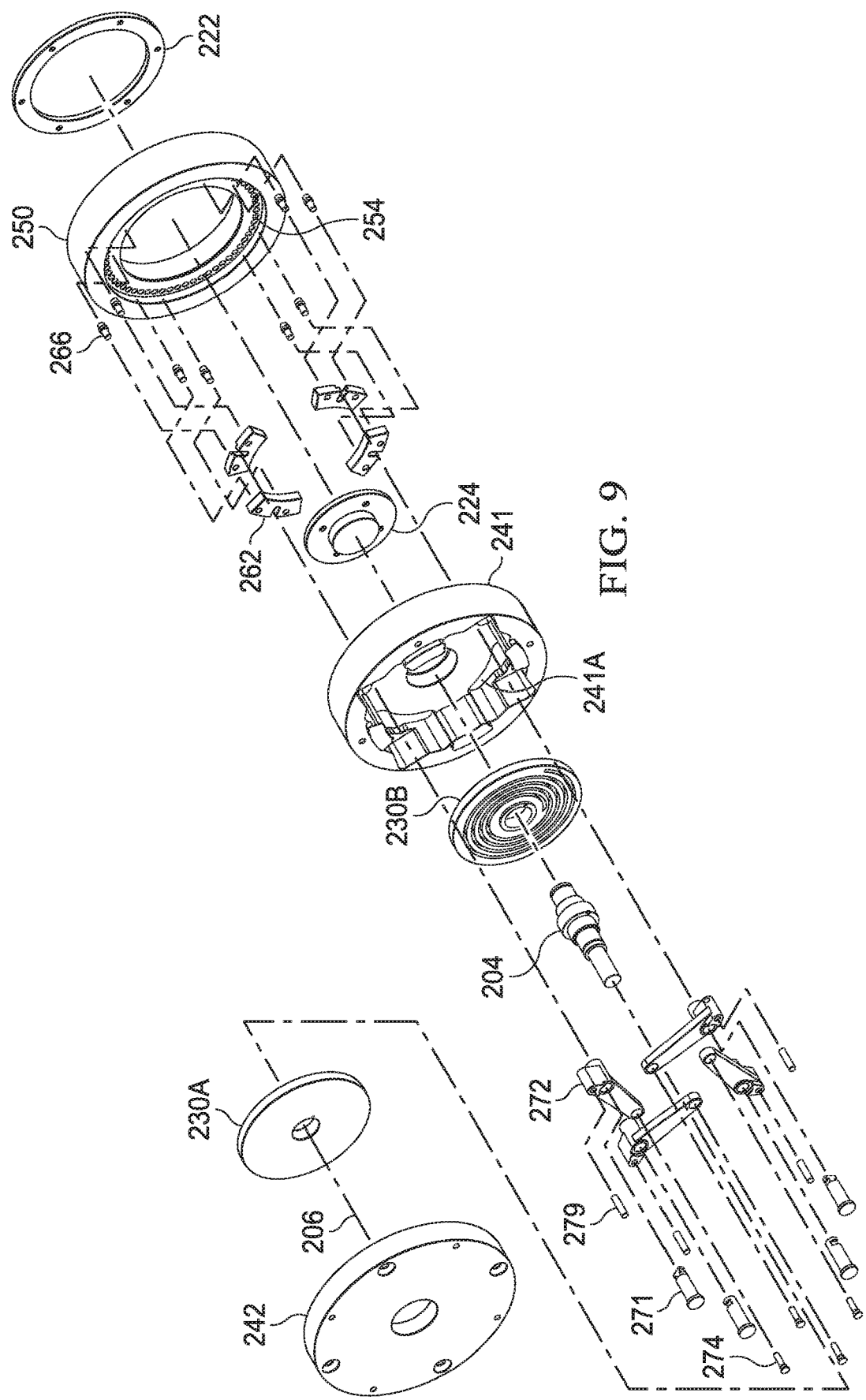
FIG. 9 is an exploded view of the gearbox mechanism of the present invention.

With reference to the Figures, and in particular FIGS. 8 and 9, an embodiment of a spiral gearbox mechanism 220 of the present invention is depicted. In an exemplary embodiment, the spiral gearbox mechanism 220 works with a power source or actuator, which includes a coupling device that transmits the power generated by the power source. While the embodiment shown in the Figures generally depicts an input shaft 204 coupled with the spiral gearbox mechanism 220, it is understood that there are numerous possible embodiments. For example, the input shaft 204 may be directly connected to a power source. Alternatively, the input shaft 204 may also be coupled to gears, belts, or coupling devices or systems that allow for a transfer of energy and/or power. In some embodiments, the input shaft 204 may be formed with a cam assembly 230.

The output of the spiral gearbox mechanism 220 may comprise an output element 250 that is positioned along the central axis 206 passing through the input shaft 204 of the spiral gearbox mechanism 220. The spiral gearbox mechanism 220 can be configured about the central axis 206 passing through the input shaft 204 and may comprise two stationary plates—the main body stationary plate 241 and the outer stationary plate 242—a void may be defined within and/or between the main body stationary plate 241, and the outer stationary plate 242. A cam assembly 230 (that may include a first spiral cam body or element 230A, and a second spiral cam body or element 230B) and a plurality of cam-actuated pivot assemblies 270 (FIG. 12D), may be housed within the void, between, and/or within the main body stationary plate 241, and the outer stationary plate 242. The cam assembly 230 and a plurality of cam-actuated pivot assemblies 270 and/or torque block assemblies 260 (FIG. 12D), can transfer power from the cam assembly 230 to the spiral output element 250.

The main body stationary plate 241 can be an interface or separator between the cam assembly 230 and the output element 250. The main body stationary plate 241 may have apertures defined through its planar surface (may also be referred to as the front or rear surface) which allow for the plurality of cam-actuated torque block assemblies 260 pass and engage with the output element 250. The pivot assemblies 270 may be positioned between each body 230A/230B of the cam assembly 230 such that one end of the pivot assemblies 270 including the torque block assembly 260 is positioned along and/or outside the circumference of the cam assembly 230. In at least one embodiment, the torque block assemblies 260 are evenly spaced about the circumference of the cam assembly 230 or outside the circumference of the cam assembly 230. In other embodiments, the torque block assemblies 260 may be unevenly spaced about the circumference of the cam assembly 230 or outside the circumference of the cam assembly 230.

Each torque block assembly 260 includes a torque block 262 coupled with torque pins 266. The torque block assemblies 260 can be coupled to a pivot assembly 270 via the torque block 262. Each pivot assembly 270 comprises a pivot lever 272; a spiral cam follower 274 pivotably coupled to a first or distal end of the pivot lever 272 closer to the central axis 206 of the gearbox mechanism; a linkage pin 271 coupled to the pivot lever 272 and a torque block 262 at a second or proximal end of the pivot lever 272; and a fixed axis pivot point 278 on the second or proximal end of the pivot lever 272 opposite of the spiral cam follower 274. The fixed axis pivot point 278 connects the pivot assembly 270 with the main body stationary plate 241 and/or outer stationary plate 242 by a pivot pin 279. For example, the pivot pin 279 may extend from one or both sides of the spiral fixed axis pivot point 278 to allow for the pivot pin 279 to couple with one or both of the main body stationary plate 241 and/or outer stationary plate 242. While each torque block assembly 260 can slidably couple and rotate with its respective linkage pin 271, the block assembly 260 can be moved in a three-dimensional (3D) circuit based on the movement and pivoting of the pivot assembly 270. The pivot assembly 270, is configured and aligned in a manner that allows for rotation, or angular motion about the fixed pivot point 278 and/or pivot pin 279.

As shown in the embodiment depicted in the Figures, the plurality of torque block assemblies 260 transfer power from the input shaft 204 and/or cam assembly 230 to the output element 250. In a preferred embodiment, each torque block assembly 260 includes a torque block 262 coupled with torque pins 266 which correspond to a complementary interface surface 254 (e.g., a plurality of torque pin holes) configured on a planar surface of the output element 250 perpendicular to the central axis 206. In other embodiments, the torque pins 266 may be gear teeth that can allow for an engagement with an interface surface of the output element 250, along the inner or outer circumferential surface, or planar surface. It is understood that the interface between the torque block 262 with torque pins 266 and any surface of the output element 250 of the present invention comprises not only the preferred pins and holes as depicted, but also any complementary arrangement such as gear teeth or even friction fit surfaces. However, in the depicted preferred embodiment, the output interface surface 254 (e.g., a plurality of torque pin holes) are arranged in a ring coaxial to the central axis 206, and are positioned so that torque pins 266 can engage or disengage the output interface surface 254.

While the output element 250 is depicted as a single circular ring, it is understood that the output element 250 may comprise two circular rings held apart by spacer elements. The output element 250 includes a central aperture or hole for coaxial arrangement of the output element 250 surrounding and/or adjacent to the main body stationary plate 241. In addition, it is understood that the inner or outer circumference of the output element 250 or a planar surface of the output element 250 opposite the planar surface adjacent to the main body stationary plate 241 may also comprise a surface to interface with some other gear train mechanism or pin and holes mechanism.

Figure 10B:
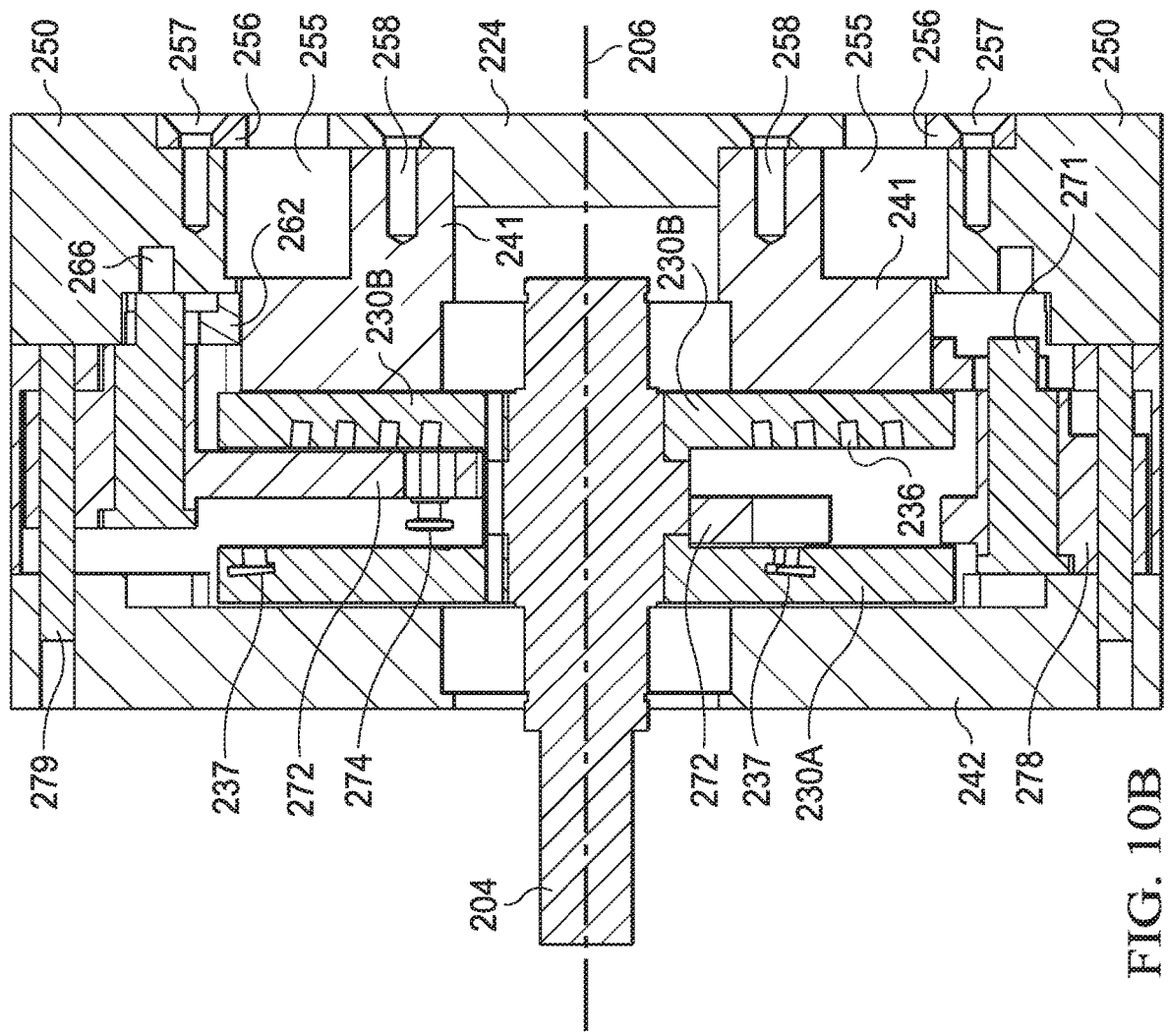
FIG. 10B is a cross-sectional view of a spiral gearbox mechanism shown in FIG. 10A.

With reference to FIGS. 10A, 10B, 10C and 11, a preferred embodiment of the gearbox mechanism is shown in unexploded views, one of which is a cross-sectional view of the gearbox mechanism. In the depicted preferred embodiment, the cam assembly 230 is positioned between the outer stationary plate 242 and the main body stationary plate 241, with the first cam body or element 230A facing the second cam body 230B. The pivot lever 272 and the cam follower 274 are positioned between the first cam body 230A and the second cam body 230B, with the pivot lever 272 extending beyond the circumference of the cam assembly 230. The torque pin 266 and the fixed axis pivot point 278 are located on the opposite end of the pivot lever 272 from the cam follower 274. The fixed axis pivot point 278 comprises an aperture configured and sized to receive a pivot pin 279 that pivotably couples the pivot lever 272 to the main body stationary plate 241 and/or outer stationary plate 242, and the linkage pin 271 slidably and rotatably couples the pivot lever 272 to the torque block 262. The torque block 262 is coupled to torque pins 266 and extend through apertures of the main body stationary plate 241 so that the torque pins 266 can engage with the output interface surface 254 (e.g., a plurality of torque pin holes). The torque pin holes can be configured and sized to receive at least a portion of the torque pins 266. As mentioned previously, the torque block 262 and torque pins 266 move along the three-dimensional circuit created by the two pathways 236, 237 of the cam assembly 230. In FIG. 10B, the two torque block assemblies 260 illustrated show that the cam follower 274 are engaged with the first spiral pathway 236 (not illustrated in FIG. 10B) of the first cam body 230A, and disengaged from the second spiral pathway 237 (not illustrated in FIG. 10B) of the second cam body 230B.

With reference to FIG. 10A, a perspective view of the outer stationary plate 242 is illustrated. The outer stationary plate 242 can have a first level 243A that is depressed from, and/or surrounded by a second level 243B. The second level 243B can also create a lip or circumferential surface of the outer stationary plate 242, that defines a void or a first half of a void that allows for the housing of the cam assembly (not illustrated), torque block assembly (not illustrated), and/or pivot assembly (not illustrated). In at least one embodiment, the second level 243B is a circular ring, and in alternative embodiments may be other shapes, or have additional opening or voids around the inner circumference to allow for the housing of the cam assembly (not illustrated), torque block assembly (not illustrated), and/or pivot assembly (not illustrated).

The outer stationary plate 242 may also include one or more securing apertures 245. The securing apertures 245, allow for the outer stationary plate 242 to be fastened with a fastener (not illustrated) to the main body stationary plate 241. Additionally, the securing fastener (not illustrated) can also allow for the outer stationary plate 242 to be secured to a power source, device, or holder. The outer stationary plate 242, can also have at least one spacer aperture 246 that allows for the spacing of the outer stationary plate 242 and main body stationary plate 241 to be modified by a spacing fastener (not illustrated). For example, the spacing between the stationary plates 241/242 may require adjustment to give the cam assembly 230 more freedom of movement and/or rotation within the void created between the plates. The spacing fastener (not illustrated) can provide an anchor for a spacer device, such as a plastic or metal washer. The spacing fastener (not illustrated) may be a set screw or other fastener. The outer stationary plate 242 may also have a bearing, set of bearings, or rollers 247.

With reference to FIG. 10B, a cross-sectional view of the gearbox mechanism 220 is provided. The gearbox mechanism 220 can have an input shaft 204 aligned along a central axis 206. The input shaft 204 may pass through a central aperture of an outer stationary plate 242. The outer stationary plate 242 can house and/or support one or more cam bodies or elements 230A/230B of a cam assembly 230. The cam bodies or elements can have pathways 236/237 that are unique to each cam body or element 230A/230B. The unique pathways 236/237 allow for a cam follower 274 to travel along the pathways 236/237 and generate movements of a pivot lever 272. The pivot lever 272 may be coupled to the outer stationary plate 242, and/or the main body stationary plate 241 via a pivot point 278 and pivot pin 279. The pivot lever 272 can move in a three-dimensional (3D) circuit of motion based on the position of the cam follower 274 along one of the unique pathways 236/237, the pivot point 278, and pivot pin 279. For example, as a cam follower 274 transitions from a first pathway 236 to a second pathway 237, the pivot lever 272 may also transition in a liner manner along the pivot pin 279. The linear movement of the pivot lever 272 can also generate a linear movement of the torque block 262 via the linkage pin 271. As illustrated the linear movement would be a left or right movement.

The void that houses and/or supports the cam assembly 230 can have on one side the main body stationary plate 241. The main body stationary plate 241, can have a central aperture for allowing the input shaft 204 to pass through, and at least one main body aperture to allow the torque block(s) 262, and torque pins 266 to pass through. The main body aperture(s) allow the torque block(s) 262, and their interface surface (illustrated here as pins 266) to engage with a corresponding interface surface on an output element. The output element 250 can have an interface surface 254 (illustrated here as a pin and hole configuration) that allows for the transfer of power from the input shaft 204, through the cam assembly 230, pivot assembly 270, and gear block assembly 260, to the output element 250. The output element 250 can also have a bearing, set of bearings, or rollers 255 to ease the movement of the output element 250. The bearing, set of bearings, or rollers 255 can be coupled to the output element 250 via a retainer 256, and/or fastener(s) 257. The retainer 256 can be coupled and/or fastened to the output element 250. In at least one embodiment, the output element 250 can have a central aperture that allows the output element 250 to interface with the main body stationary plate 241. The interfacing may be direct, or indirect through the bearing, set of bearings, or rollers 255. A cap 224 can also be coupled to the main body stationary plate 241 via fasteners 258. The cap 224 can also interface with the output element 250, and/or bearing, set of bearings, or rollers 255.

Figure 10C:
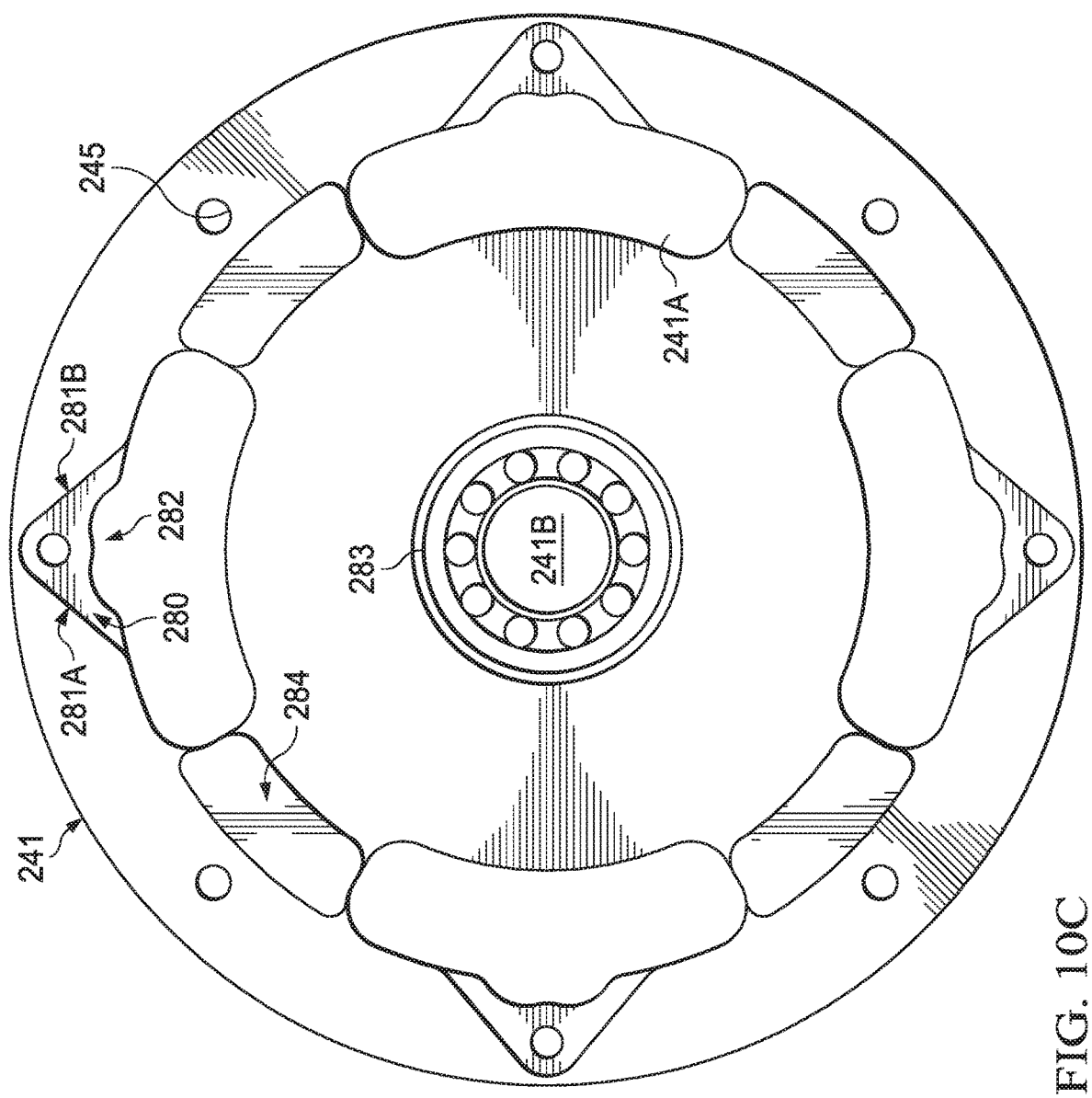
FIG. 10C is a front view of a main body stationary plate.

With reference now to FIG. 10C, an illustration of the main body stationary plate 241 in a perspective view is depicted. The main body stationary plate 241, does not move with respect to the output ring (not illustrated), nor the outer stationary plate (not illustrated). The main body stationary plate 241 can be coupled to the outer stationary plate (not illustrated) by one or more securing apertures 245. The securing apertures 245, allow for the main body stationary plate 241 to be fastened with a fastener (not illustrated) to the outer stationary plate 242. The main body stationary plate 241, can have main body aperture(s) 241A that are sized and configured to allow a torque block assembly (not illustrated) to pass through. The torque block assembly (not illustrated) can be moveably coupled to a pivot assembly (not illustrated). The pivot assembly (not illustrated) may be pivotably coupled to the main body stationary plate 241 by a pivot pin (not illustrated) that is removably coupled to the main body stationary plate 241 and/or outer stationary plate (not illustrated). The pivot pin (not illustrated), can be received by a pivot point 278 that is defined by the main body stationary plate, outer stationary plate, or pivot lever.

The main body stationary plate 241 can also have a pivot receiver 280 that is sized and configured to allow for a pivot lever 272 to pivot about a pivot pin (not illustrated). The pivot receiver 280 can have at least one blocking point 281A, 281B (collectively 281) that prevents a pivot assembly (not illustrated) from exceeding its desired pivoting movements. In at least one embodiment, the blocking point (s) 281 prevent a pivot lever (not illustrated) from rotating beyond the bounds of it pivot rotation. The pivot lever (not illustrated) may also be prevented from exceeding a defined linear motion up and down along a pivot pin (not illustrated) by the pivot receiver 280. The pivot receiver 280 can also have a rotation indention 282. In some embodiments, the rotation indention 282 can be comprised of two indention(s).

The main body stationary plate 241 may also include a bearing, set of bearings, or rollers 283 surrounding the main body stationary plate central aperture 241B. The bearing, set of bearings, or rollers 283 can support an input shaft (not illustrated) that passes through the cam assembly (not illustrated). For example, the bearing, set of bearings, or rollers 283 can provide a rotatable support for the input shaft (not illustrated), and/or the cam assembly (not illustrated) that can be coupled to the input shaft. A support surface 284 can also be a surface of the main body stationary plate 241. The support surface 284 can provide support for the outer stationary plate (not illustrated), and/or a stand-off or stanchion of a depth similar to the depth of the torque blocks (not illustrated). The stand-off would allow for the proper spacing of the cam assembly (not illustrated) within the main body stationary plate 241, and/or outer stationary plate (not illustrated).

Figure 11:
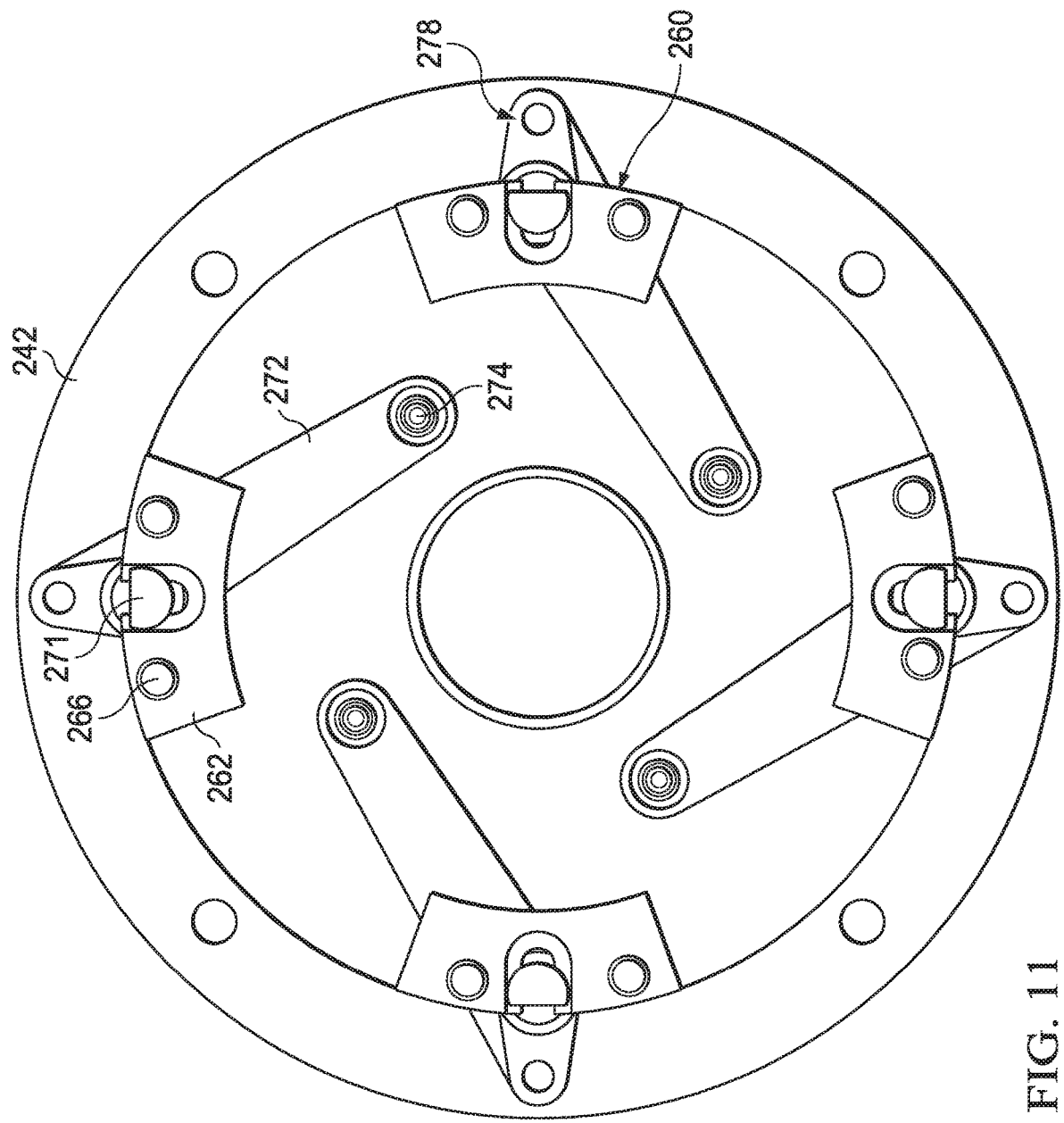
FIG. 11 is a front view of a spiral gearbox mechanism and stationary plate.

With reference now to FIG. 11, a top view of an outer stationary plate 242, pivot assembly 270, and torque block assembly 260 is depicted. The pivot assembly 270 can be pivotally coupled to the outer stationary plate 242 and/or main body stationary plate (not illustrated). The pivoting connection can be through the pivot point 278 and/or pivot pin 279. As the pivot assembly 270 pivots around the pivot point 278 the pivot lever 272 can be guided by paths, channels, and/or grooves of a cam assembly (not illustrated). The paths, channels, and/or grooves of a cam assembly (not illustrated) can also engage the pivot lever 272 through a cam follower 274 generating a movement that would cause a pivoting motion of the pivot assembly 270 and/or torque block assembly 260 about a pivot point 278, and/or pivot pin 279. The torque block assembly 260 can be slidably connected to the pivot assembly 270 via a linkage pin 271. The linkage pin 271 can accept a torque block 262, through a sliding connection. However, the connection can also be performed through other methods such as a fastener or other connection means. The torque block(s) 262 can have an interface surface, such as, but not limited to torque pin(s) 266. The interface surface can engage with an output interface surface through pin and hole, gears, belts, and/or other interfacing methods or systems that allow for a transfer of energy and/or power. The torque block assembly 260 can move in combination with the pivot assembly 270, in an angular, and linear motion. In at least one embodiment, as the pivot assembly is rotatably moved and/or pivoted about the pivot point 278 and/or pivot point 279 in an angular rotation, the torque block assembly can also have a corresponding angular rotation. The corresponding angular rotation of the torque block assembly 260 can be in direct relation to the movement of the pivot assembly 270 or can be a ratioed angular movement based that moves in relation to the angular movement of the pivot assembly. The pivot assembly 270 may also move linear (as illustrated in and out of the page) with respective to the position of the cam follower 274 along one or more paths, channels, and/or grooves of a cam assembly (not illustrated). The torque block assemblies 260 can also relative to the linear movements of the pivot assembly 270. As the pivot assembly 270 moves linearly the torque block assembly 260 can also move linearly and engage or disengage from an output interface surface. For example, the angular rotation of the pivot assembly 270 and/or torque block assembly 260 can be cyclical, and at specific points along the cyclical movement a linear motion can occur.

Figure 12A:
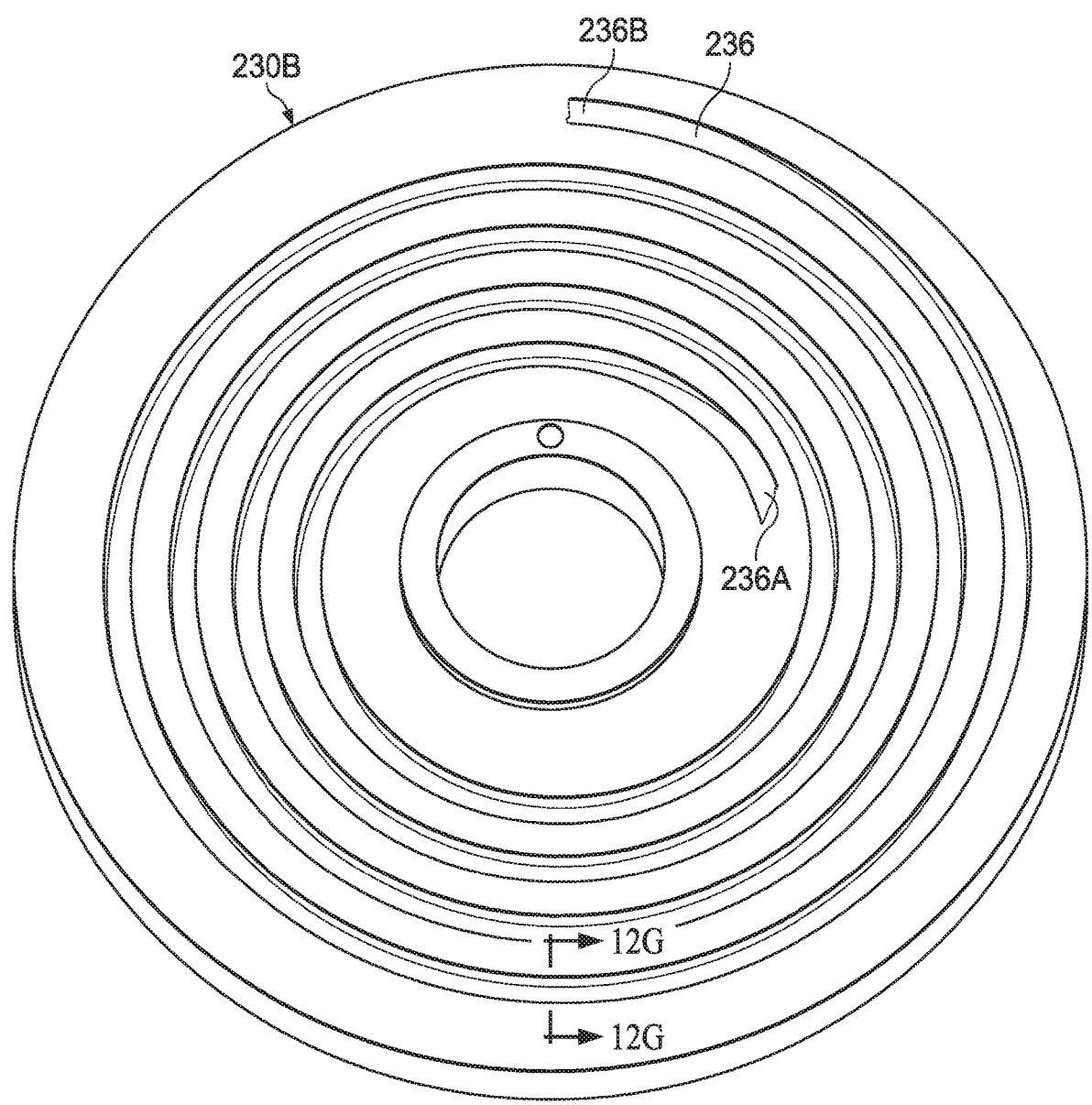
FIG. 12A is a perspective view of one half of a cam assembly of the spiral gearbox mechanism.
Figure 12C:
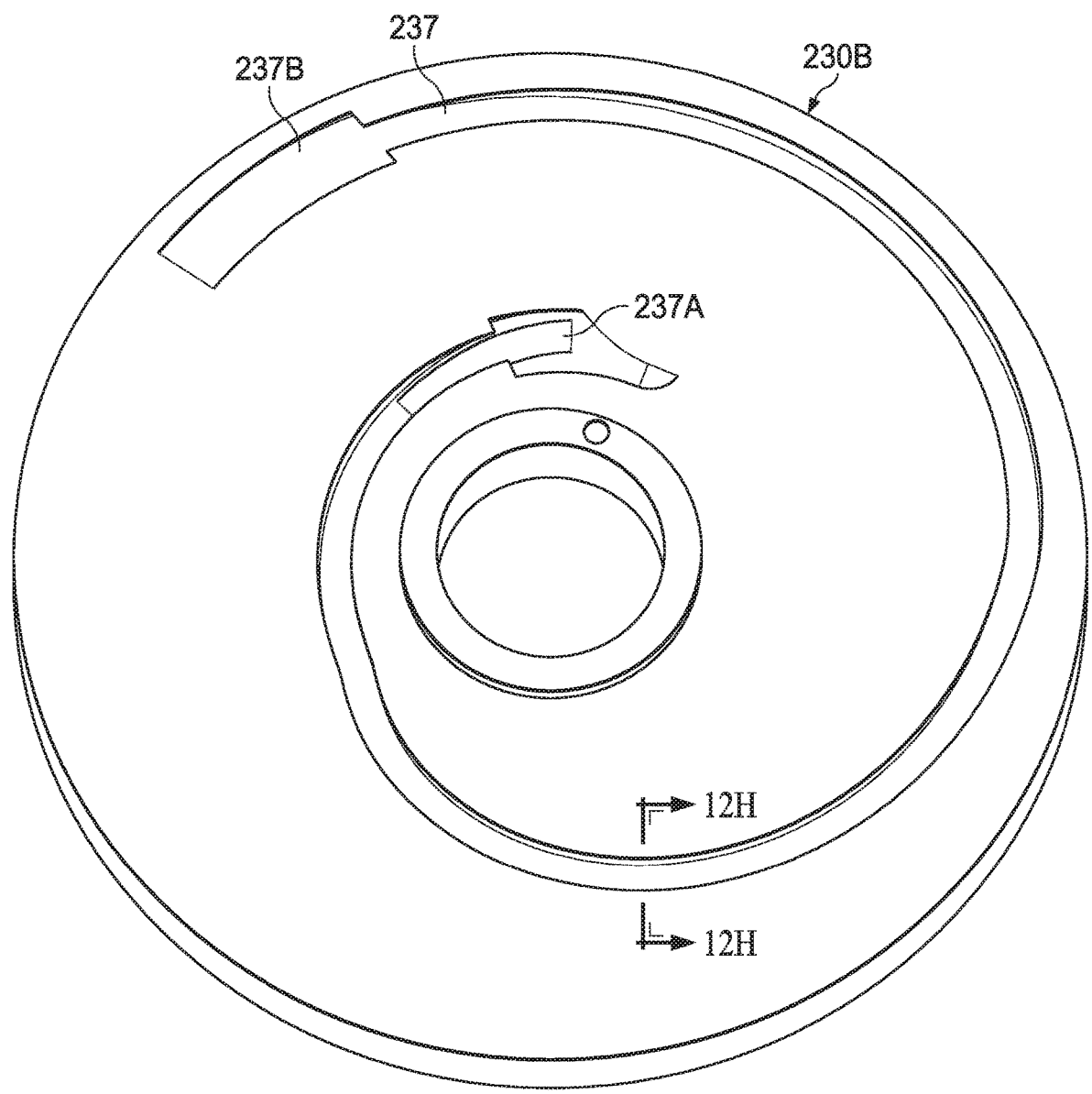
FIG. 12C is a perspective view of one half of a cam assembly of the spiral gear block mechanism.
Figure 12D:
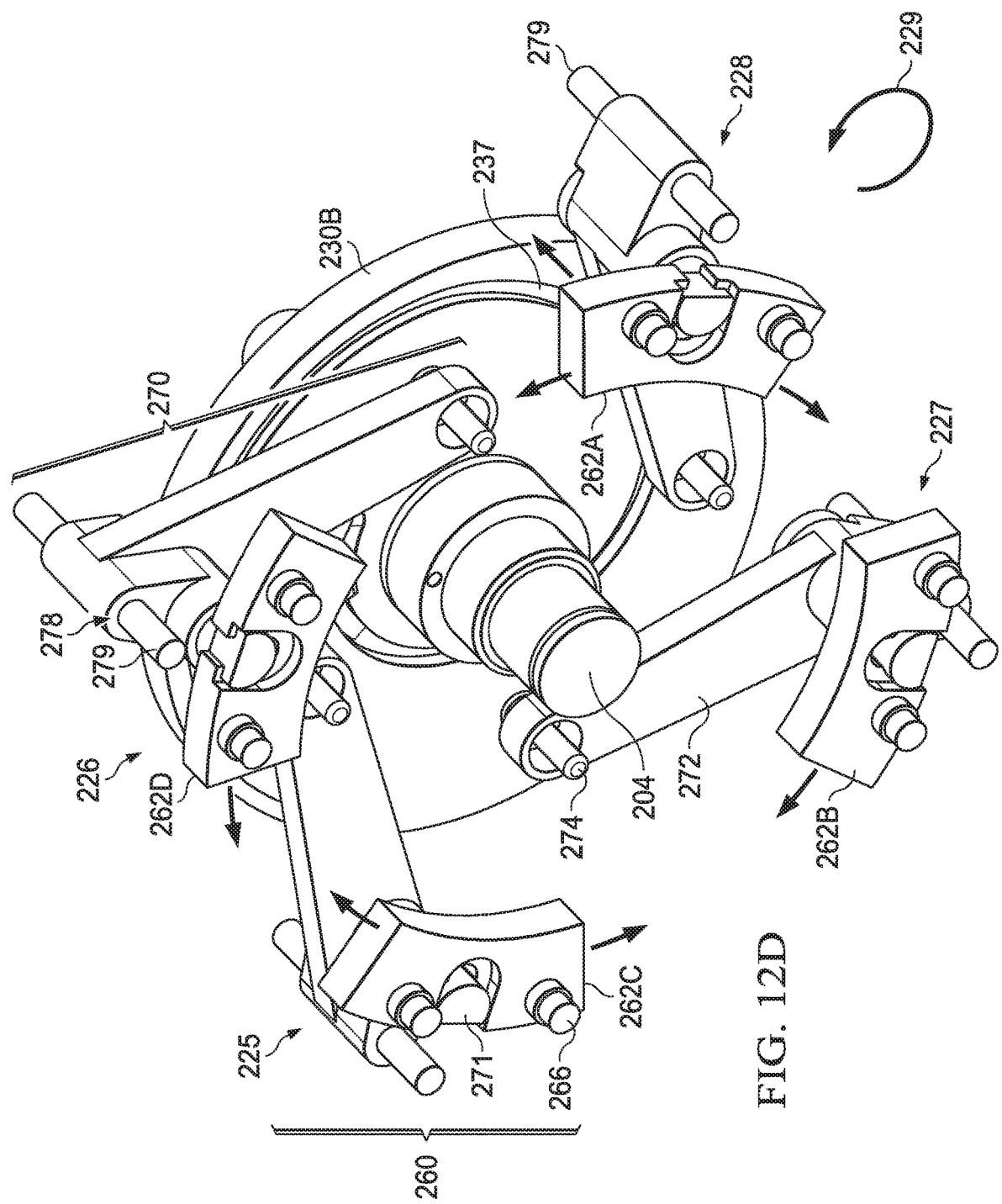
FIG. 12D is a perspective view of a cam assembly coupled with torque block assemblies of the spiral gearbox mechanism.

With reference now to FIGS. 12A, 12B, 12C, 12D, 12E, 12F, 1211, and 12G a preferred embodiment of the torque block assemblies 260 and the cam assembly 230 is shown. FIG. 12A shows a perspective view of the first cam body or element 230A with the first spiral pathway 236, and FIG. 12C shows a perspective view of the second cam body or element 230B with the second spiral pathway 237. In the depicted preferred embodiment, each torque block assembly 260 may be positioned along the outer edges of the cam assembly 230. The pivot assembly 270 can be positioned between the first cam body or element 230A and the second cam body or element 230B. FIG. 12B illustrates the torque block assembly 260 and pivot assembly 270 with the first cam body or element 230A, and FIG. 12D illustrates the torque block assembly 260 and pivot assembly 270 with the second cam body or element 230B. As mentioned previously, the torque block assembly 260 comprises a torque block 262 and torque pins 266. The pivot assembly 270 includes a pivot lever 272 pivotably coupled to the torque block 262 with a linkage pin 271, and includes a cam follower 274 engaged with either the first spiral pathway 236 or the second return spiral pathway 237 and pivotably coupled to the distal end of the pivot lever 272. The first spiral pathway 236 and the second return spiral pathway 237 may be combined to create a circuitous pathway. The pivot assembly 270 also includes fixed axis pivot point 278 that is rotatively coupled to a fixed axis of rotation relative to the central axis 206 of rotation of the cam assembly 230. For example, a fixed axis pivot point pin 279 secured in corresponding fixed axis alignment holes 278 configured in the main body stationary plate 241 and/or outer stationary plate 242 and at the proximal end of the pivot lever 272 serves as a fixed axis of rotation relative to the rotation of the cam assembly 230 about the central axis 206. While the pivot lever 272 may pivot about its fixed axis pivot point 278, the alignment and configuration of the fixed axis pivot point 278 remains fixed in relation to the pivot lever 272 and the main body stationary plate 241 and/or outer stationary plate 242. Each of the pivot assemblies 270 is biased so that the cam follower 274 of each pivot assembly 270 maintains contact with the either of the two spiral pathways 236, 237 throughout the rotation cycle of the cam assembly 230. For example, in the depicted preferred embodiment, the gearbox mechanism comprises four torque block assemblies 260, and pivot assemblies 270 and they are positioned and biased so that the cam follower 274 of each pivot assembly 270 and the rotation of the cam assembly 230 does not cause the collision of the cam follower 274. The torque block assemblies 260 can be evenly spaced along a circumference surrounding the central axis 206. In at least one embodiment, the torque block assemblies 260 are arranged and evenly spaced outside the circumference of the cam assembly 230.

The torque blocks 262 of the torque block assemblies 260 are specifically designed to enable a greater surface area (e.g., greater number of pins) to engage the output element 250 at any given time, thereby spreading the stresses associated therein across a greater area. By increasing the contact area and number of pins coupled to the corresponding output interface surface 254 at any given time, the mechanical stress level is significantly decreased. In addition, torque block assemblies 260 of the present invention reduce backlash to zero and even preloaded conditions to create a tight connection between any power source and any powered device. Moreover, because the stresses associated with engagement of the torque blocks 262 and torque pins 266 with the output interface surface 254 are distributed across a greater area and a greater number pins and holes, the torque block assemblies 260 may be manufactured with lighter weight materials, which are typically less expensive and easier to manufacture, with no degradation in reliability. By reducing its weight and size, the gearbox mechanism of the present invention is adaptable to a broad range of applications that were previously impractical because of weight and space limitations.

As shown in the embodiment depicted in the Figures, especially FIGS. 12A and 12C, the cam assembly 230 is coupled to a power source by means of the input shaft 204. Thus the power generated by a power source is transferred to the input shaft 204, which causes the cam assembly 230 to rotate about the central axis 206. The cam assembly 230 comprises a first cam body or element 230A with a first spiral pathway 236 and a second cam body or element 230B with a second spiral pathway 237 which interface with the cam follower 274 of each pivot assembly 270. As the cam assembly 230 rotates, the movements of the torque blocks 262 and torque pins 266 is controlled in three dimensions in accordance with a certain design parameter. Because of the circuitous pathway the cam follower 274 may follow a spiral pathway on both the first cam body or element 230A and the second cam body or element 230B. The rate of change of the radius of the pathway curves may vary and therefore, the pivot assemblies 270 drives each torque block assembly 260 including torque block 262 and torque pins 266 through a three-dimensional circuit in response to rotation of the cam assembly 230. Broadly speaking, the three-dimensional circuit includes urging the torque block assembly 260 to engage the output element 250 and move or rotate the output element 250 a specified distance prior to disengaging the output element 250, and returning back the specified distance to again reengage the output element 250 once again and repeat the process. It is understood that the three-dimensional circuit or circuitous pathway formed by the first spiral pathway 236 and the second return spiral pathway 237 is not to scale and may be exaggerated to illustrate the general principal of the invention. The travel path or circuit of each torque block 262 and corresponding torque pins 266 is controlled by the angling and configuration of the various pivot assemblies 270 and/or spiral pathways 236, 237 of the cam assembly 230.

It is understood that the spiral curve of the spiral pathways 236, 237 of the present invention can be defined as a curve that closes or opens upon itself, or a first point along the pathway. While in some embodiments portions of the spiral pathways may have a constant rate of change (e.g., a constantly increasing distance from the first point). In other embodiments, the rate of change may be variable, to create a spiral curve with one or more curve profiles. For example, a spiral pathway may include a first section with a constant rate of change, and a second section with a variable rate of change.

In a preferred embodiment, each pivot assembly 270 includes a pivot lever 272 that is coupled to other components. A cam follower 274 is pivotably coupled to a distal end of the pivot lever 272, and maintains contact with either the first spiral pathway 236 formed in the first cam body or element 230A or the second spiral pathway 237 formed in the second cam body or element 230B. The distal end of the pivot lever 272 is positioned closer to the central axis 206 as compared to the proximal end of the pivot lever 272. At the proximal end of the pivot lever 272 is the fixed axis pivot point 278. The fixed axis pivot point 278 includes a pin that pivotably couples the pivot assembly 270 to the main body stationary plate 241. Also near the proximal end of the pivot lever 272 is a linkage pin 271 that pivotably couples the pivot lever 272 to the torque block 262.

Each of the pivot assemblies 270 are biased so that its respective cam follower 274 maintains engagement with either the first spiral pathway 236 formed in the first cam body 230A or the second spiral pathway 237 formed in the second cam body 230B throughout the rotation cycle of the cam assembly 230. For example, one of the pivot assemblies 270 maintains engagement with the second spiral pathway 237 of the second cam element or body 230B, and the other pivot assemblies 270 maintains engagement with the first spiral pathway 236 of the first cam element or body 230A. In a preferred embodiment, the pivot assemblies 270 will include at least four pivot assemblies 270 that can be configured to allow three of the pivot assemblies 270 to be engaged with the first cam element or body 230A, and one of the pivot assemblies 270 to be engaged with the second cam element or body 230B.

The first spiral pathway 236 comprises a curved path emanating from a first end 236A of the first spiral pathway 236. The first spiral pathway 236 revolves around the center of the first cam element 230A at a continuously increasing distance from the center until the first spiral pathway 236 ends at a second spiral end 236B of the first spiral pathway 236. The continuously increasing distance from the center of the first cam element 230A creates a unique effect on the torque block assemblies 260 as the cam assembly 230 rotates. It would be understood that in some embodiments, the distance may not increase continuously or at all for at least one section of the spiral pathway 236, 237. Each end 236A, 236B of the first spiral pathway 236 is angled in elevation, which allows for engagement and disengagement with the first spiral pathway 236. For example, when the cam follower 274 is engaged with the first spiral pathway 236, the cam follower 274 eventually reaches the second end 236B of the first spiral pathway 236. Upon reaching the second end 236B of the first spiral pathway 236, the cam follower 274 gradually disengages from the first spiral pathway 236 because the gradual incline or elevation of the second end 236B of the first spiral pathway 236 urges the cam follower 274 to elevate out of the first spiral pathway. Accordingly, when the cam follower 274 is disengaged from the first spiral pathway 236, the cam follower 274 eventually reaches the first end 237A of the second spiral pathway 237. Upon reaching the first end 236A of the first spiral pathway 236, the cam follower 274 gradually engages with the first spiral pathway 236 because the gradual decline or elevation of the first end 236A of the first spiral pathway 236 urges the spiral cam follower 274 to descend into the first spiral pathway 236. The first spiral pathway 236, in at least one embodiment, can be a groove for a cam follower (not illustrated) to travel or traverse. The first spiral pathway 236 can have a first side 290A, a second side 290B, and a bottom 291 defined by the first cam body 230A. In other embodiments, the first spiral pathway 236 may be comprised of other grooves and/or channels that would engage a cam follower.

Similarly, the second spiral pathway 237 comprises a curved path emanating from a first end 237A of the second spiral pathway 237, and the second spiral pathway 237 revolves around the center of the second cam body 230B at a continuously increasing distance from the center of the second cam element 230B until the second spiral pathway 237 ends at the second end 237B of the second spiral pathway 237. While the first spiral pathway 236 comprises multiple revolutions around the center of the first cam element or body 230A, the second spiral pathway 237 comprises a single revolution around the center of the second cam element or body 230B to facilitate the return of the cam follower 274 from the second end 236B of the first spiral pathway 236 to the first end 236A of the first spiral pathway 236. Like the first spiral pathway 236, each end 237A, 237B of the second spiral pathway 237 is angled in elevation, which allows for engagement and disengagement with the second spiral pathway 237. For example, when the cam follower 274 is engaged with the second spiral pathway 237, the cam follower 274 eventually reaches the second end 237B of the second spiral pathway 237. Upon reaching the second end 237B of the second spiral pathway 237, the cam follower 274 gradually disengages from the second spiral pathway 237 because the gradual incline or elevation of the second end 237B of the second spiral pathway 237 urges the cam follower 274 to elevate out of the second spiral pathway 237. Accordingly, when the cam follower 274 is disengaged from the second spiral pathway 237, the cam follower 274 eventually reaches the first end 236A of the first spiral pathway 236. Upon reaching the first end 237A of the second spiral pathway 237, the cam follower 274 gradually engages with the second spiral pathway 237 because the gradual incline or elevation of the first end 237A of the second spiral pathway 237 urges the cam follower 274 to descend into the second spiral pathway 237. The second spiral pathway 237, in at least one embodiment, can have a channel 292 that allows for the engagement of a cam follower (not illustrated). The channel 292 can have a shaft gap 293 and a receiving section 294 sized and configured to receive a portion of a cam follower (not illustrated) that corresponds to the size and shape of the receiving section 294, defined by the second cam body 230B. In other embodiments, the receiving section may be sized and configured to receive any number of shapes or configurations of a cam follower.

As the cam assembly 230 rotates, the cam follower 274 shifts according to the first spiral pathway 236 and the second spiral pathway 237, and causes the shifting and pivoting of the pivot lever 272. For the pivot assemblies 270 with cam follower 274 engaged with the first spiral pathway 236, the shifting and pivoting of the pivot lever 272 causes the torque blocks 262 to shift and pivot accordingly, and thereby urge the movement and rotation of the output element 250 using the torque pins 266 engaged with the output interface surface 254. For the pivot assemblies 270 with the cam follower 274 engaged with the second spiral pathway 237, the shifting and pivoting of the pivot lever 272 causes the torque block 262 to move in a direction opposite of the direction of rotation of the output element 250. By moving in a direction opposite of the direction of rotation of the output element 250, the torque block assembly 260 returns back the specified distance to again reengage the output element 250. This predetermined circuit of movement of the torque block assembly 260 can be precisely calibrated to meet specific engineering requirements. For example, the torque ratio and speed reduction may be regulated and controlled by adjusting the revolutions of the first spiral pathway 236 and or second spiral pathway 237.

Once a cam follower 274 reaches the second end 237B of the second spiral pathway 237, the cam follower 274 gradually disengages from the second spiral pathway 237 through the gradual elevation of the cam follower 274 using the gradual incline of the second end 237B of the second spiral pathway 237. As the cam follower 274 gradually disengages from the second spiral pathway 237, the cam follower 274 gradually engages with the first spiral pathway 236 through the gradual descent of the cam follower 274 into the first spiral pathway 236 using the gradual incline of the first end 236A of the first spiral pathway 236. Similarly, once the cam follower 274 reaches the second end of the first spiral pathway 236, the cam follower 274 gradually disengages from the first spiral pathway 236 through the gradual elevation of the cam follower 274 using the gradual incline of the second end of the first spiral pathway 236. As the cam follower 274 gradually disengages from the first spiral pathway 236, the cam follower 274 gradually engages with the second spiral pathway through the gradual descent of the cam follower 274 into the second spiral pathway using the gradual incline of the first end of the second spiral pathway 237. Accordingly, the travel path of each cam follower 274 is three-dimensional because the transitions between the first spiral pathway 236 and the second spiral pathway 237 move the cam follower 274 in a direction parallel to the central axis 206. An example of the path taken by each of the cam follower 274 is shown in FIG. 12F. It is understood that the three-dimensional path made by the first spiral pathway 236 and the second spiral pathway 237 is not to scale and may be exaggerated to illustrate the general principal of the invention. In at least one embodiment, the pathways 236, 237 are formed as corresponding pathways on opposing interior surfaces of the cam elements 230A, 230B which create a circuitous pathway. These surfaces in one example would be opposing each other as interior surfaces when placed together as cam assembly 230. Alternatively, in other examples, the corresponding surfaces would be configured opposite of each other as exterior surfaces when formed as cam assembly 230.

Figure 12E:
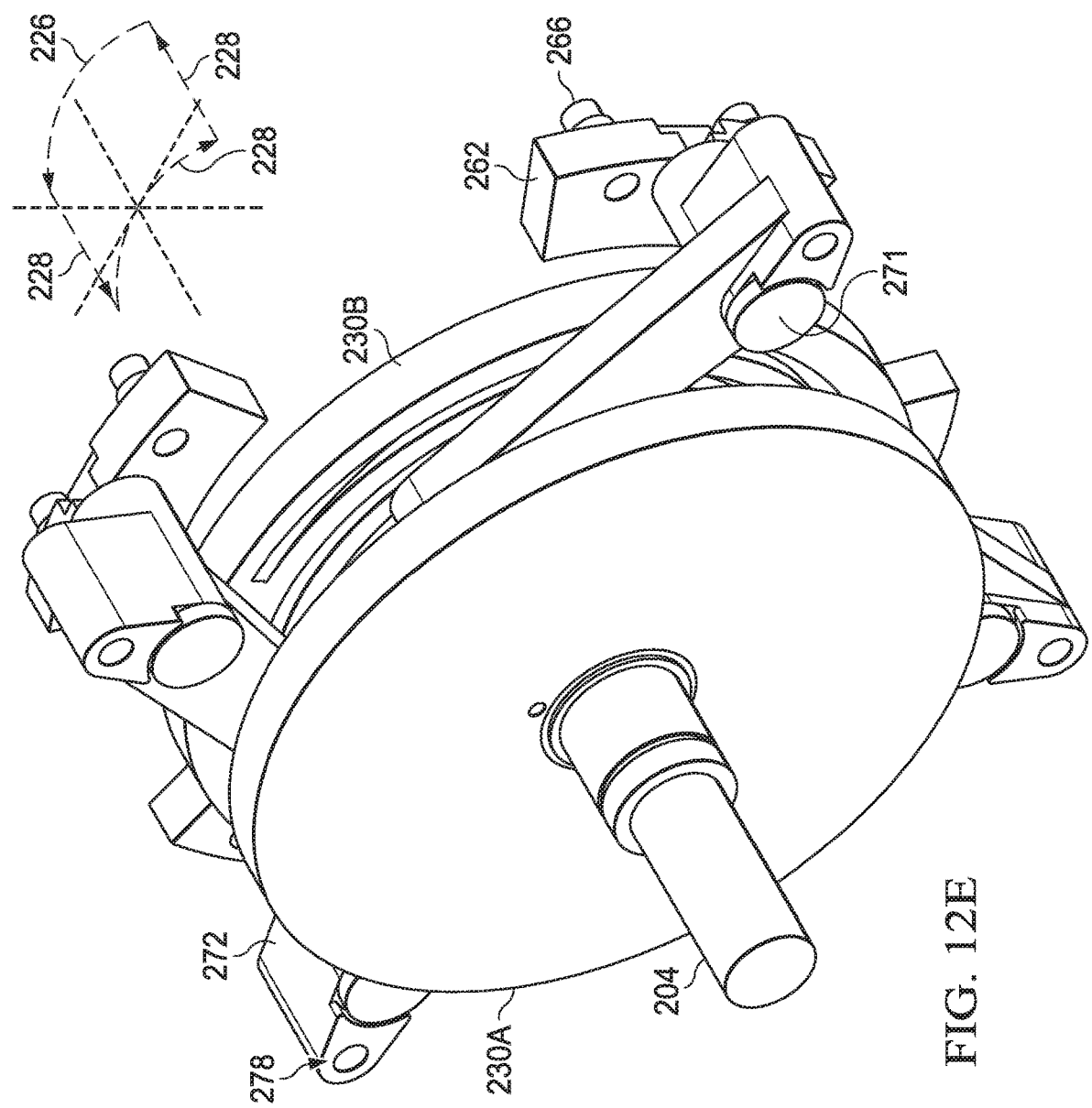
FIG. 12E is a perspective view of a cam assembly coupled with torque block assemblies of the spiral gearbox mechanism.
Figure 12F:
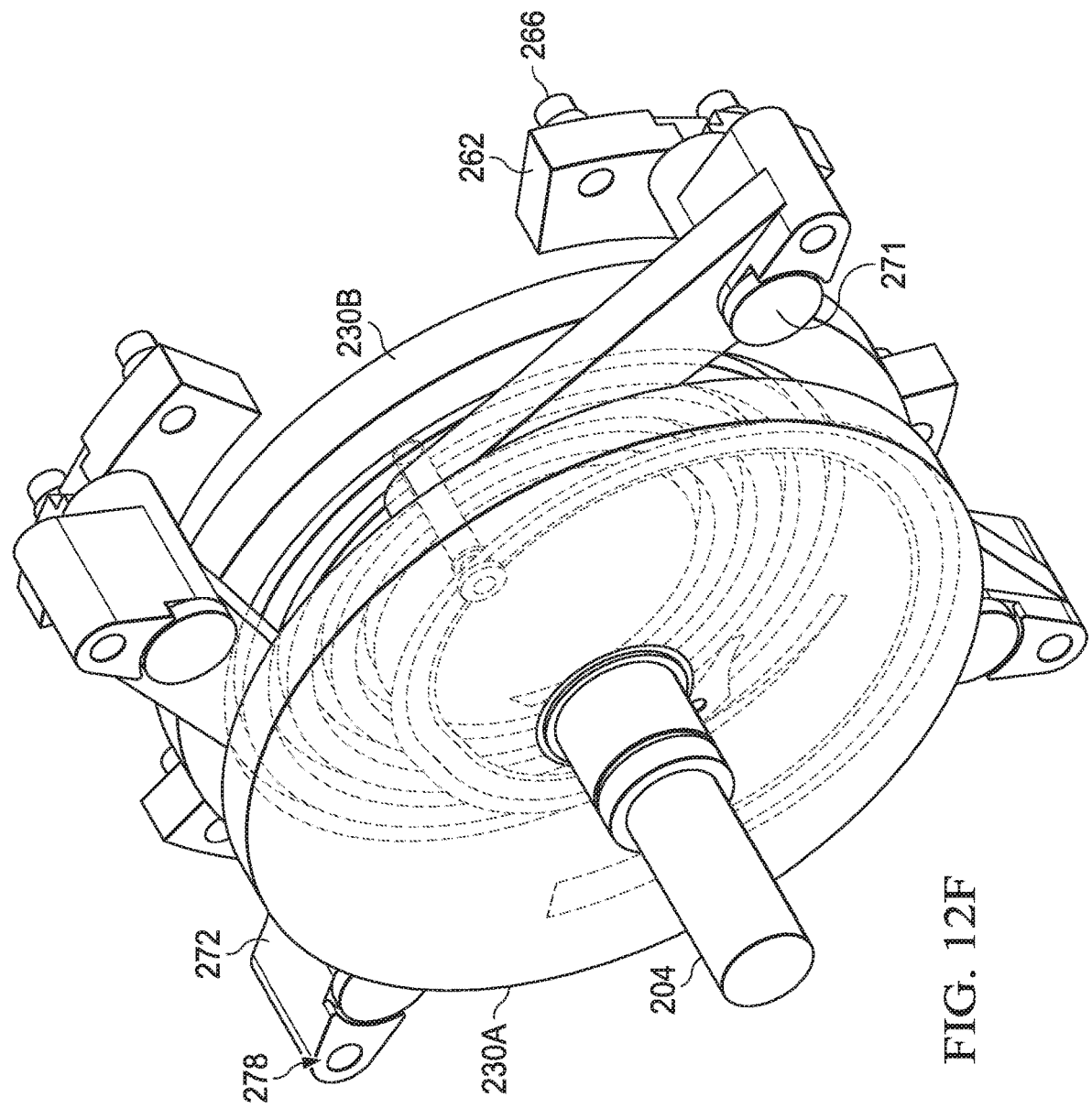
FIG. 12F is a perspective silhouetted view of a cam assembly coupled with torque block assemblies of the spiral gearbox mechanism.
Figure 12G:
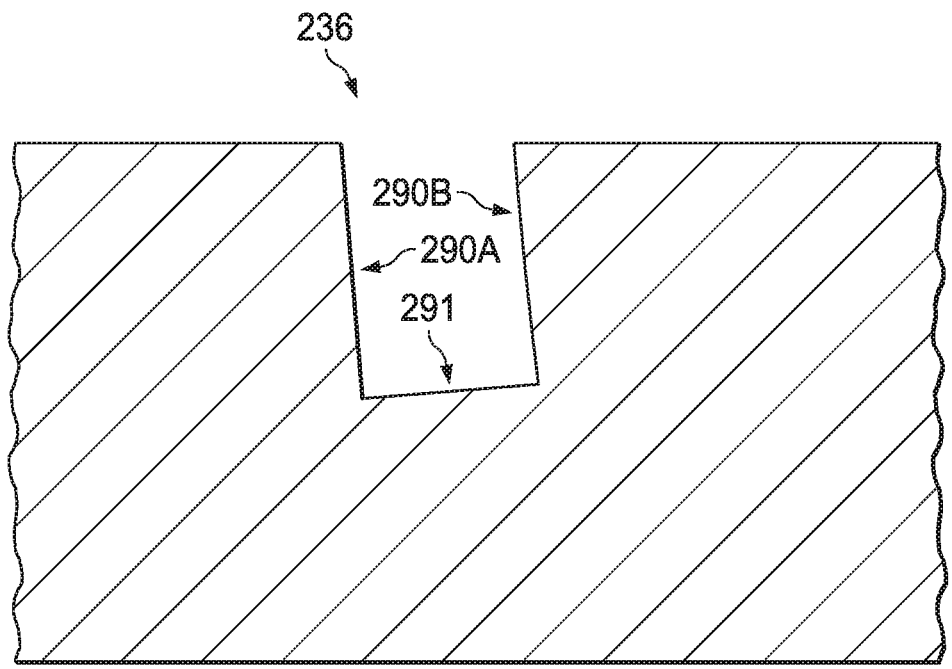
FIG. 12G is a cutaway view of a channel of a one half of a cam assembly of the spiral gearbox mechanism.
Figure 12H:
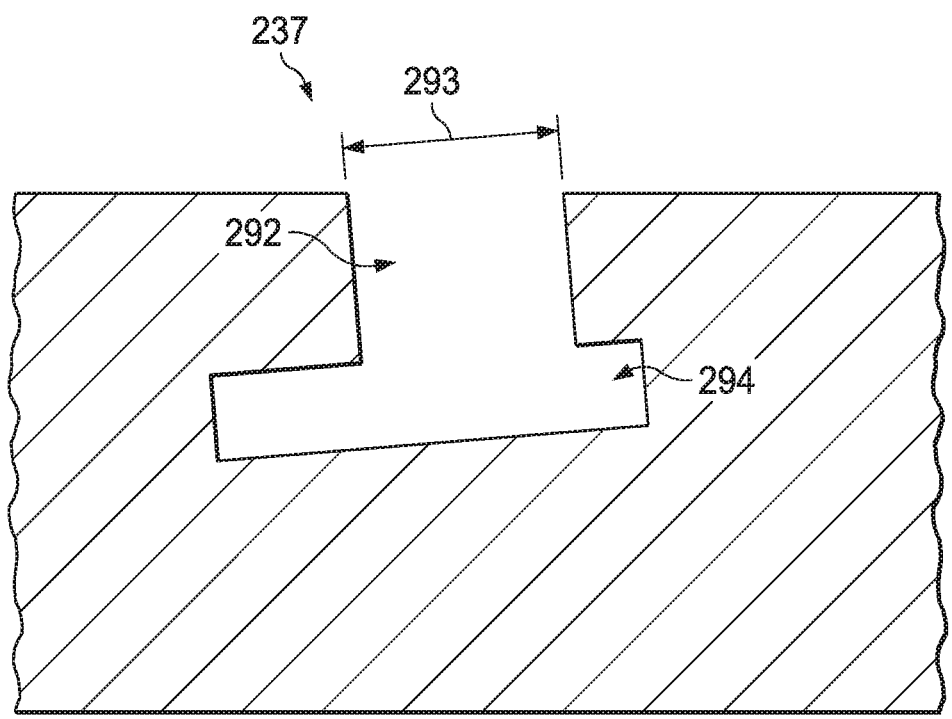
FIG. 12H is a cutaway view of a channel of a one half of a cam assembly of the spiral gearbox mechanism.

With reference to FIGS. 12D and 12E, that are illustrations of gear blocks and general movements of the torque block assemblies 260 relative to the movement of an output element 229. The gear block(s) illustrated 262 are shown in various positions starting with the right most gear block 262A is shown in a transitioning/repositioning position 228 where it is fully disengaged from the interface surface 254 of the output element (not illustrated) and the interface surface 266 (illustrated as a set of pins) of the gear block 262A is fully disengaged. Moving to gear block 262B, that is shown in a reversed tension or negative bias configuration 227. There can also be a position such as one that gear block 262C is in, a neutral bias configuration 225. Gear block 162D is illustrated in a positively biased or engaged configuration 226, which can result in a rotation of the output element (not illustrated). There can be three engagement positions for a gear block to be in: an engaged or positive bias position 226, a reversed tension or negative bias position 227, and/or a neutral bias or balanced position 225. Additionally, a gear block can be in a transitioning/repositioning position 228, which allows for the gear block 262 to disengage and/or move away from the output element (not illustrated) to return to one of the engagement positions.

Moreover, it should be understood that the annular or closed loop cyclical movement of each gear block and cam element may be specifically programmed or designed to vary the bias configurations during a single cycle to enhance the effectiveness of the gear block assembly. Additionally, the amount or strength of bias, whether positive, negative, or balanced can be calibrated and varied throughout the cycle. For example, in one embodiment, when a gear block first engages the interface surface of the output element, the gear block is designed to engage with a neutral bias to maximize the efficiency of the engagement process, then quickly transition to a positive bias to maximize power transfer, then slightly before disengagement a return to a neutral bias to assist with an efficient disengagement prior to the transitioning/repositioning. The negative bias configuration could be programmed into the cycle to minimize backlash.

Figure 13A:
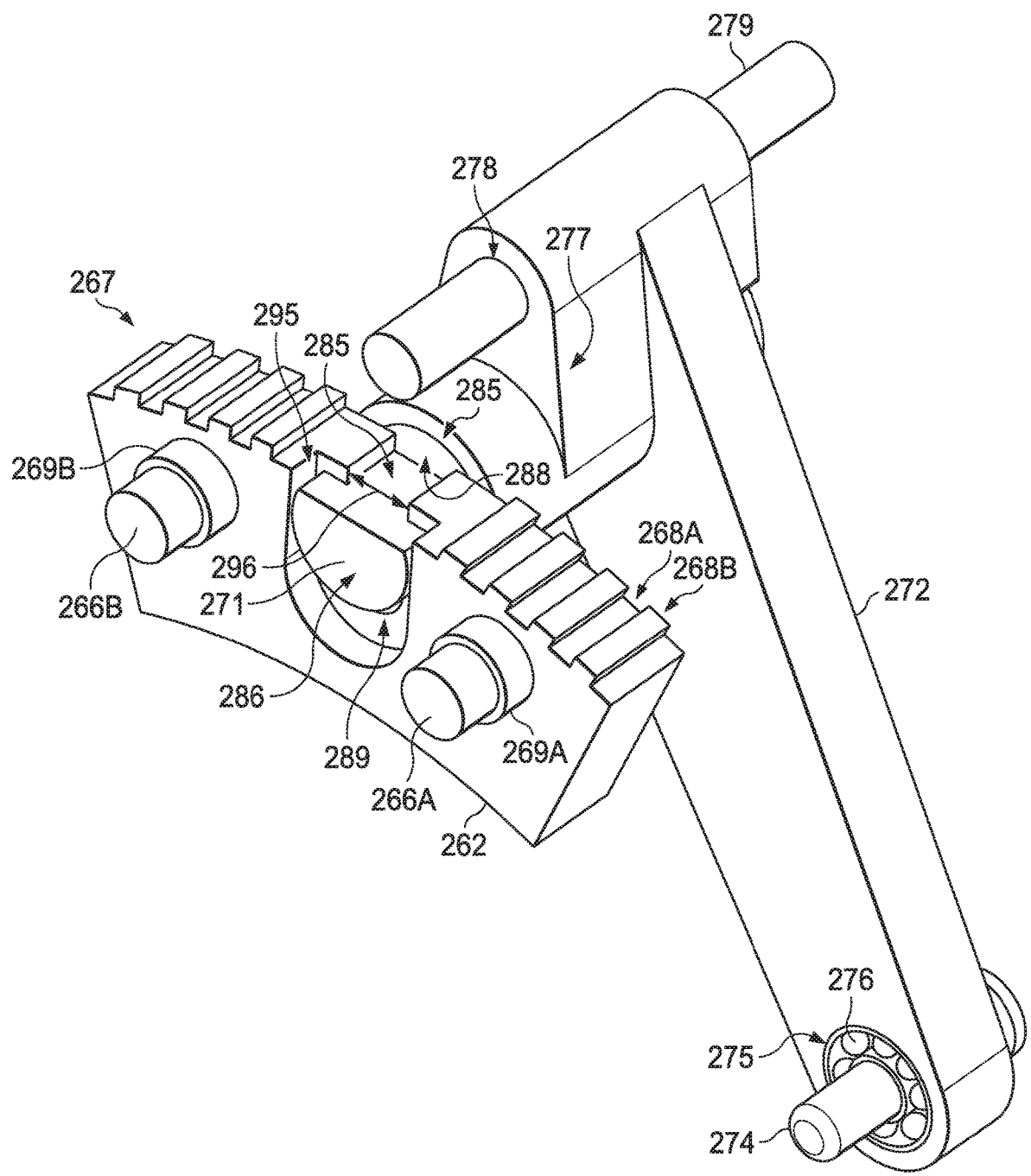
FIG. 13A is a front perspective view of a pivot assembly and gear block assembly of the spiral gearbox mechanism.
Figure 13B:
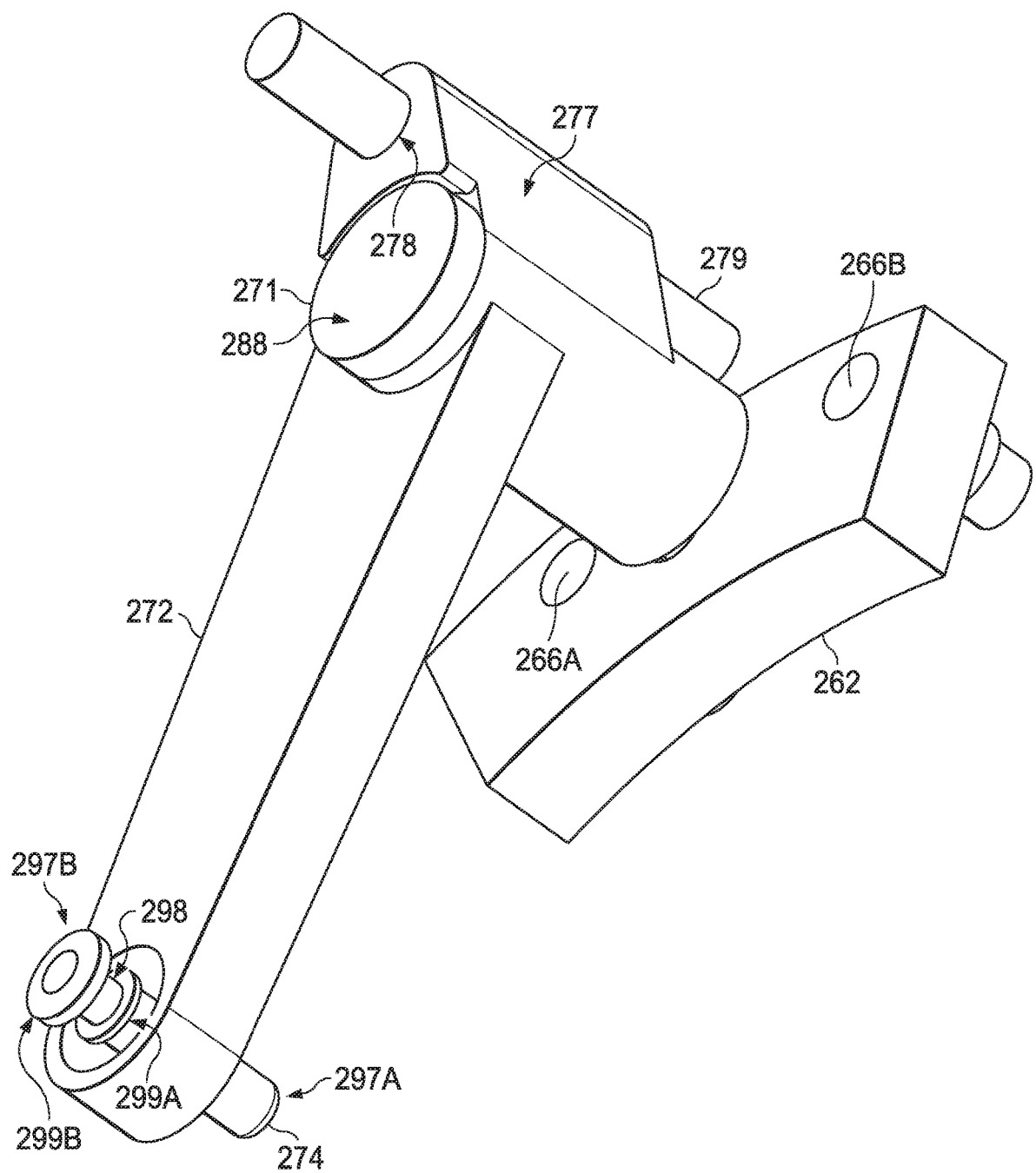
FIG. 13B is a rear perspective view of a pivot assembly and gear block assembly of the spiral gearbox mechanism.

With reference now to FIGS. 13A and 13B, a front perspective view, and a rear perspective view of a pivot assembly 270 and torque block assembly 260 are illustrated. The pivot assembly 270 in at least one embodiment includes a pivot lever 272, a cam follower 274, and a linkage pin 271. The pivot lever 272 may have a cam follower aperture 275 configured to accept a cam follower 274, and/or a bearing, set of bearings, or roller(s) 276. The cam follower aperture 275 may be at a distal end of the pivot lever 272, and be sized and defining a passage for a portion of a cam follower 274 to pass through and coupled. At a proximal end of the pivot lever 272, a pivot column 277 can define a pivot point 278 that can allow for a pivot pin 279 to be passed through and/or coupled to the pivot lever 272. The pivot column 277 can also define a linage pin aperture 285 to allow for a linkage pin 271 to pass through and/or couple to the pivot lever 272.

The linkage pin 271 can have a link head 286 coupled with a link shaft 287, coupled to the linkage pin body 288. In at least one embodiment, the link head 286 is equal to or greater in diameter than the linkage pin body 288. The link shaft 287 can sized with a width and length that allow for a torque block 262 to be slidably coupled to the linkage pin 271. The torque block 262 can have a block opening 289. The block opening 289 can have a block shelf 295, and block gap 296. The block shelf 295 can allow the link head 286 to be even and/or not extend above a top surface of the torque block 262. In other examples, the link head 286 can extend above the top surface of the torque block 262 to allow for a buffering or setoff from a surface of the output element 250. The torque block 262 can include at least on interface surface illustrated as torque pins 266A, 266B (collectively 266) or gear teeth 267. The gear teeth 267, can have a valley 268A, and ridges 268B, or other forms of interface surfaces for engagement and/or disengagement with an output element or device. In some embodiments, the torque pins 266 can have a standoff section 269A, 269B (collectively 269) that prevents the torque pins from engaging with an output element or device in a manner that would prevent the torque block 262 from disengaging from the output element or device. For example, if the torque pins 262 engage too deep with an output element or device, it may prevent the torque block 262 from being able to disengage from the output element or device.

To allow for a coupling and/or engagement of the cam follower 274 with the respective pathways (not illustrated), a first tracking end 297A and a second tracking end 297B can be utilized to prevent the cam follower 274 from following the wrong pathway. The first tracking end 297A that can have a pin or point that is smaller than the second tracking end 297B. The second tracking end 297B may have a groove 298 with a flanges 299A, 299B (collectively 299) that allow for an engagement with a pathway (not illustrated). The second tracking end 297B may have other shapes such as a following head or band larger than the main body of the cam follower 274.

Numerous embodiments of gearbox mechanisms are possible using the torque block assembly 260 of the present invention. All embodiments of gearbox mechanisms constructed in accordance with the present invention feature a plurality of torque block assemblies 260 configured about the central axis 206 of the cam assembly 230 and may comprise either an odd or even number of torque block assemblies 260. At least two, preferably four gear block assemblies are required for a gearbox mechanism of the present invention.

It will now be evident to those skilled in the art that there has been described herein an improved gearbox mechanism. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A gearbox mechanism comprising in combination:
   two cam elements configured with a surface of each said cam elements facing each other, and having a circuitous pathway formed in surfaces of said cam elements;
   a cam follower for maintaining contact with the circuitous pathway;
   a pivot lever rotatably coupled to the cam follower;
   a cam-actuated torque block driving through a three-dimensional circuit of movement in response to rotation of said cam elements; and
   an output element that is engaged by the cam-actuated torque block.

2. The gearbox mechanism of claim 1, wherein said cam elements rotate about a central axis.

3. The gearbox mechanism of claim 1, wherein the output element rotates about a central axis.

4. The gearbox mechanism of claim 1, further comprising a main body.

5. The gearbox mechanism of claim 4, wherein the main body further comprises a main body aperture.

6. The gearbox mechanism of claim 4, wherein the main body further comprises a pivot receiver for accepting the pivot lever.

7. The gearbox mechanism of claim 1, wherein the cam follower has a first tracking end and a second tracking end.

8. The gearbox mechanism of claim 7, wherein the second tracking end further comprises a groove and at least one flange.

9. The gearbox mechanism of claim 1, wherein said surface of each cam element is planar and perpendicular to a central axis about which the cam elements rotate.

10. The gearbox mechanism of claim 1, wherein the circuitous pathway formed in surfaces of said cam elements includes a spiral pathway portion and a return spiral pathway portion.

11. A cam-actuated torque block assembly comprising:
    a torque block having an interface surface;
    a pivot lever for actuating the torque block; and
    a cam follower rotatably coupled to the pivot lever, wherein the cam follower follows a three-dimensional circuit of movement.

12. The cam-actuated torque block assembly of claim 11, wherein the interface surface further comprise a set of gear teeth.

13. The cam-actuated torque block assembly of claim 11, wherein the interface surface further comprises at least one torque pin.

14. The cam-actuated torque block assembly of claim 11, wherein the pivot lever further comprises a pivot pin.

15. The cam-actuated torque block assembly of claim 11, wherein the cam follower further comprises a first tracking end and a second tracking end.

16. The cam-actuated torque block assembly of claim 15, wherein the first tracking end further comprises a pin.

17. The cam-actuated torque block assembly of claim 15, wherein the second tracking end further comprises a groove and at least one flange.

18. The cam-actuated torque block assembly of claim 15, wherein the pivot lever further comprises a first end and a second end.

19. The cam-actuated torque block assembly of claim 18, wherein the first end further comprises a cam follower aperture for receiving the cam follower.

20. The cam-actuated torque block assembly of claim 18, wherein the second end is coupled to the torque block.

21. A cam assembly configured in a cam-actuated gearbox comprising:
   two cam elements configured with each having a planer surface parallel to one another, wherein each cam element has a portion of a circuitous pathway formed in the planar surface of said cam elements;
   wherein said cam elements are configured to receive a cam follower of a pivot assembly.

22. The cam assembly of claim 21, wherein the first cam element has a first portion of the circuitous pathway.

23. The cam assembly of claim 22, wherein the first portion of the circuitous pathway has a varying depth.

24. The cam assembly of claim 22, wherein the first portion further comprises a first side, a second side, and a bottom defined by the first cam element.

25. The cam assembly of claim 24, wherein the first side, the second side, and the bottom are configured to receive a first tracking end of the cam follower.

26. The cam assembly of claim 21, wherein the second cam element has a second portion of the circuitous pathway.

27. The cam assembly of claim 26, wherein the second portion of the circuitous pathway has a varying depth.

28. The cam assembly of claim 26, wherein the second portion further comprises a channel.

29. The cam assembly of claim 28, wherein the channel further comprises a shaft gap and a receiving section.

30. The cam assembly of claim 28, wherein the channel is configured to receive a second tracking end of the cam follower.

* * * * *